United States Patent
Kojima et al.

(10) Patent No.: US 7,094,276 B2
(45) Date of Patent: Aug. 22, 2006

(54) HYDROGEN STORAGE MATERIAL AND HYDROGEN STORAGE APPARATUS

(75) Inventors: Yoshitsugu Kojima, Aichi-ken (JP); Yasuaki Kawai, Nagoya (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 608 days.

(21) Appl. No.: 10/255,955

(22) Filed: Sep. 27, 2002

(65) Prior Publication Data

US 2003/0170165 A1  Sep. 11, 2003

(30) Foreign Application Priority Data

Sep. 28, 2001  (JP)  .............................. 2001-301782
Feb. 4, 2002  (JP)  .............................. 2002-027240
Jun. 11, 2002  (JP)  .............................. 2002-170211

(51) Int. Cl.
*C01B 3/00*    (2006.01)
*B01J 20/20*   (2006.01)
*F17C 11/00*   (2006.01)

(52) U.S. Cl. .................. 96/153; 502/417; 502/526; 206/0.7; 420/900

(58) Field of Classification Search ................ 96/108, 96/153; 502/416, 417, 526; 423/648.1; 206/0.7; 420/900

See application file for complete search history.

(56) References Cited

U.S. PATENT DOCUMENTS

| | | | | |
|---|---|---|---|---|
| 4,580,404 A | * | 4/1986 | Pez et al. ...................... | 62/55.5 |
| 4,716,736 A | * | 1/1988 | Schwarz ....................... | 62/46.2 |
| 5,185,221 A | * | 2/1993 | Rampel ........................ | 429/59 |
| 5,653,951 A | * | 8/1997 | Rodriguez et al. ........... | 423/439 |
| 5,795,471 A | * | 8/1998 | Naito .......................... | 210/223 |
| 5,962,165 A | * | 10/1999 | Tsuruta et al. ............ | 429/218.2 |
| 6,159,538 A | * | 12/2000 | Rodriguez et al. ...... | 427/213.31 |
| 6,207,264 B1 | * | 3/2001 | Robinson et al. ......... | 428/304.4 |
| 6,290,753 B1 | * | 9/2001 | Maeland et al. .............. | 95/116 |
| 6,309,446 B1 | * | 10/2001 | Nakanoya et al. ............ | 95/102 |
| 6,503,584 B1 | * | 1/2003 | McAlister ................... | 428/34.1 |
| 6,596,055 B1 | * | 7/2003 | Cooper et al. ................ | 95/116 |

FOREIGN PATENT DOCUMENTS

| | | |
|---|---|---|
| JP | 60-247073 | 12/1985 |
| JP | 10-072201 A * | 3/1998 |
| JP | 2000-103612 | 4/2000 |
| JP | 2001-122608 | 5/2001 |
| JP | 2001-220101 | 8/2001 |
| WO | WO 200153550 A1 * | 7/2001 |

* cited by examiner

*Primary Examiner*—Frank M. Lawrence
(74) *Attorney, Agent, or Firm*—Oblon, Spivak, McClelland, Maier & Neustadt, P.C.

(57) ABSTRACT

The present invention involves a carbon-based hydrogen storage material which includes a carbon material, exhibiting a specific surface area, being 1,000 m²/g or more, and a bulk density, being from 0.4 g/cm³ or more to 1 g/cm³ or less. The carbon-based hydrogen storage material is such that the hydrogen storage capacity per unit volume is large. The invention also provides for a hydrogen storage apparatus whose hydrogen storage capacity per unit volume is large. The hydrogen storage apparatus is constituted so as to include a container and a hydrogen absorbing material accommodated in the container, and the hydrogen absorbing material is arranged to include a porous carbon material whose specific surface area is 1,000 m²/g or more, and a hydrogen absorbing alloy.

10 Claims, 3 Drawing Sheets

HYDROGEN STORAGE MATERIAL AND HYDROGEN STORAGE APPARATUS

BACKGROUND OF THE INVENTION

1. Field of the Invention

The present invention relates to a hydrogen storage material and a hydrogen storage apparatus which can absorb-desorb hydrogen.

2. Description of the Related Arts

Hydrogen energy is expected to be used in, for example, beginning with fuel cells used in electric sources for electric automobiles, a variety of applications. In order to put hydrogen energy to practical use, technology for safely storing-transporting hydrogen becomes important. As technologies for storing hydrogen, for instance, there are methods of compressing hydrogen with a high pressure, or liquefying it at a low temperature and filling it in a container, such as a bomb. However, in the method of compressing it with a high pressure, in case of storing a practical amount of hydrogen, its container volume has enlarged. Moreover, in the method of liquefying it at a low temperature, since it is necessary to cool hydrogen to 20 K or less, in addition, since it is necessary to always cool the container, it has a disadvantage in that the costs therefor have enlarged.

On the other hand, there is a method of storing hydrogen by filling a material, which can absorb-desorb hydrogen, in a container and storing hydrogen in the material. As one of hydrogen storage materials which can absorb-desorb hydrogen, for example, it is possible to name hydrogen absorbing alloys which absorb gaseous hydrogen in the form of solid, being metallic hydrides, under predetermined conditions and desorb hydrogen under the other conditions. Moreover, as another hydrogen storage material, porous carbon materials attract attention which absorb hydrogen by adsorbing it.

However, hydrogen absorbing alloys are heavy, and the hydrogen storage capacities per unit weight are small. Moreover, since the exothermic-endothermic heat quantities in absorbing-desorbing hydrogen are large, it is necessary to accompany cooling facilities and the like with the container filled therewith. Moreover, rare-earth-based alloys and so forth, being the representative examples of hydrogen absorbing alloys, include rare metals, and accordingly it is difficult to secure the resources and the costs are high. On the other hand, porous carbon materials have an advantage in that they are abundant as resources and are lightweight. However, porous carbon materials are such that the bulk densities are low generally, and, in case of using them by filling them in a container, it is not possible to say that the hydrogen storage capacities per unit volume is sufficient. In addition, since the hydrogen storage capacities at ordinary temperature are small, in order to obtain a practical hydrogen storage capacity, it is inevitable to use them at a low temperature of from −30° C. to −70° C. approximately.

The present invention has been done in view of the aforementioned circumstances, and its assignment is to provide a hydrogen storage material whose hydrogen storage capacity per unit volume is large, in addition to being less expensive relatively and lightweight. Further, its assignment is to provide a hydrogen storage material whose hydrogen storage capacity is large at ordinary temperature. Furthermore, its assignment is to provide a hydrogen storage apparatus whose hydrogen storage capacity per unit volume is large.

SUMMARY OF THE INVENTION

A carbon material for absorbing hydrogen according to the present invention, being a first hydrogen storage material, is characterized in that it exhibits a specific surface area being 3,000 $m^2/g$ or more, and has pores, a pore mode diameter of the pores, measured by the BJH method, being from 1 nm or more to 2 nm or less.

In general, since porous carbon materials absorb hydrogen by adsorption, the larger the specific surface area is the larger the hydrogen storage capacity per unit weight is. Namely, since the carbon material for absorbing hydrogen according to the present invention is such that the specific surface area is as large as 3,000 $m^2/g$ or more, it makes a material whose hydrogen storage capacity per unit weight is large.

Here, the crystal models of activated carbon, being one of porous carbon materials, are illustrated in FIG. 1 and FIG. 2. FIG. 1 illustrates the crystal model of usual activated carbon, and FIG. 2 illustrates the crystal model of activated carbon whose specific surface area is 1,000 $m^2/g$ or more. As illustrated in FIG. 1, activated carbon is usually constituted so that crystallites are assembled randomly in which sheets (graphenes) are layered in a large number in which carbon atoms are lined in a raw planarly. On the other hand, in activated carbon whose specific surface area is as large as 1,000 $m^2/g$ or more, as illustrated in FIG. 2, one sheet of the aforementioned graphenes exists independently, or they are laminated in an extremely small number so that each of them exists scatteredly. Crystals of the carbon material for absorbing hydrogen according to the present invention whose specific surface area is 3,000 $m^2/g$ or more are also expressed by the crystal model illustrated in FIG. 2.

The spaces, illustrated FIG. 2 and existing between the respective graphenes, make pores in the carbon material for absorbing hydrogen according to the present invention. The present inventors discovered that hydrogen molecules go into the pores, namely, the spaces existing between the graphenes, and are adsorbed onto the surfaces of the respective graphenes so that hydrogen is adsorbed onto the carbon material. Then, they believed that, by adjusting the size of these pores, it is possible to enlarge the amount of hydrogen which can be absorbed at ordinary temperature.

Namely, the carbon material for absorbing hydrogen according to the present invention has pores, a pore mode diameter of the pores, found by the BJH method, being from 1 nm or more to 2 nm or less. Usually, in porous carbon materials, pores exist which have a variety of pore diameters. Here, "the pore mode diameter found by the BJH method" means, though being described in detail later, a pore diameter which exists in the largest number among the pore diameters of the pores possessed by the carbon material for absorbing hydrogen according to the present invention. In other words, in the carbon material for absorbing hydrogen according to the present invention, pores, having a pore diameter of from 1 nm or more to 2 nm or less, exist in the largest number.

The carbon material for absorbing hydrogen according to the present invention is such that, taking the diameter of hydrogen molecule being adsorbed into consideration, the pore diameters of many of the pores are arranged to be from 1 nm or more to 2 nm or less. This pore diameter range, being from 1 nm or more to 2 nm or less, is one which corresponds to the size in which hydrogen molecules can be laminated in about two stages. As described above, hydrogen molecules adsorb onto the graphene surfaces forming the walls of the pores. Namely, in the pores, hydrogen molecules adsorb onto the pore walls. By approximating many of the pores to the size in which hydrogen molecules can be laminated in two layers, onto the facing graphene surfaces, hydrogen molecules can be adsorbed by one layer each for them, respectively. Namely, inside the pores, waste spaces, which do not contribute to adsorbing molecules, can be lessened, and accordingly it is possible to efficiently adsorb hydrogen molecules onto the surfaces of the graphenes.

Thus, by enlarging the specific surface area and arranging many of the pore diameters to be from 1 nm or more to 2 nm or less, the material for absorbing hydrogen according to the present invention makes a hydrogen storage material whose hydrogen storage capacities per unit weight as well as unit volume are large.

Moreover a carbon-based hydrogen storage material according to the present invention, being a second hydrogen storage material, is characterized in that it exhibits a specific surface area, being 1,000 $m^2/g$ or more, and a bulk density, being from 0.4 $g/cm^3$ or more to 1 $g/cm^3$ or less. That is, the carbon-based hydrogen storage material according to the present invention mainly comprises a carbon material. Then, since both of the specific surface area and bulk density are large, the hydrogen storage capacity per unit volume enlarges. Moreover, since a carbon material is lightweight, the hydrogen storage capacity per unit weight enlarges as well.

The aforementioned carbon-based hydrogen storage material according to the present invention is such that its production method is not limited in particular. As a suitable production process, for example, it is possible to name a method in which a porous carbon material, whose specific surface area is 1,000 $m^2/g$ or more, is treated by compression with a high pressure. By treating a porous carbon material, whose specific surface is large, by compression with a high pressure, the spaces, illustrated in aforementioned FIG. 2 and existing between the respective graphenes, are compressed to contract, as result, it is possible to intend to highly densify.

A hydrogen storage apparatus according to the present invention, being a hydrogen storage apparatus including a container and a hydrogen absorbing material accommodated in the container, is characterized in that said hydrogen absorbing material includes a porous carbon material whose specific surface area is 1,000 $m^2/g$ or more, and a hydrogen absorbing alloy. A hydrogen absorbing material in the hydrogen storage apparatus according to the present invention includes the porous carbon material and the hydrogen absorbing alloy. Accordingly, compared to the case of using the porous carbon material independently, the bulk density of the hydrogen absorbing material heightens. Moreover, since the lightweight porous carbon material is used, it is possible to make the apparatus itself lightweight. Moreover, since the porous carbon material is of large thermal conduction, it is easy to diffuse heat, generating when the hydrogen absorbing alloy absorbs hydrogen, and it is not required to accompany cooling facilities and the like with the container. In addition, the hydrogen absorbing alloy repeats expansion-contraction by absorbing-desorbing hydrogen, and is gradually pulverized finely. By including the porous carbon material in the hydrogen absorbing material, the agglomeration of the hydrogen absorbing alloy, accompanied by the absorb-desorb of hydrogen, is inhibited. Thus, the hydrogen storage apparatus according to the present invention is one which stores hydrogen in three states such as compressed hydrogen, adsorped hydrogen and atomic hydrogen, it is not only less expensive relatively but also lightweight, and additionally it makes an apparatus whose hydrogen storage capacity per unit volume is large.

BRIEF DESCRIPTION OF THE DRAWINGS

By reference to the following detailed description and the attached drawings, it is possible to more deeply understand the present invention. Hereinafter, the drawings will be described briefly.

DETAILED DESCRIPTION OF THE PREFERRED EMBODIMENT

Figure 1:
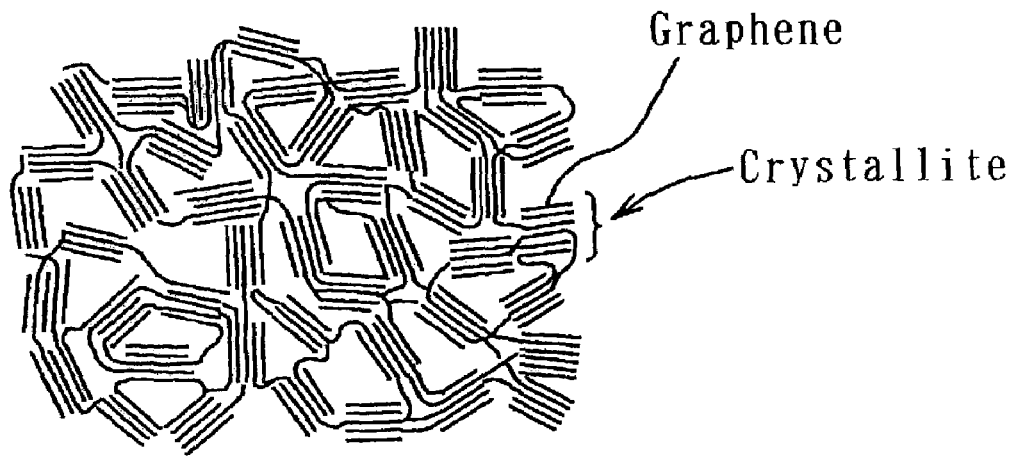
FIG. 1 illustrates the crystal model of ordinary activated carbon.
Figure 2:
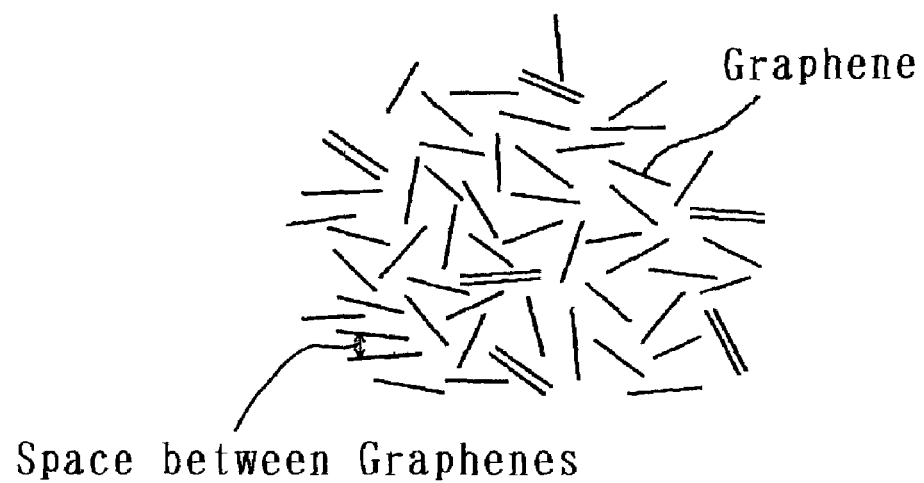
FIG. 2 illustrates the crystal model of activated carbon whose specific surface area is 1,000 $m^2/g$ or more.

Hereinafter, the carbon material for absorbing hydrogen, the carbon-based hydrogen storage material and the hydrogen storage apparatus according to the present invention will be described in detail.

Carbon Material for Absorbing Hydrogen

The carbon material for absorbing hydrogen according to the present invention, being the first hydrogen storage material, is such that it exhibits a specific surface area being 3,000 $m^2/g$ or more, and has pores, a pore mode diameter of the pores, found by the BJH method, being from 1 nm or more to 2 nm or less.

As illustrated in the aforementioned crystal model of activated carbon, the carbon material for absorbing hydrogen according to the present invention has such a structure that the graphenes exist substantially independently and scatteredly, and its specific surface area is 3,000 $m^2/g$. From the viewpoint of further enlarging the hydrogen storage capacity, one whose specific surface area exceeds 3,000 $m^2/g$ is preferable, and moreover being 3,200 $m^2/g$ is more suitable. In the present specification, the specific surface area is such that the value, measured by the BET type adsorption method. Specifically, a carbon material to be measured is put in a sample tube, and $N_2$ is adsorbed by flowing a mixture gas of $N_2$ and He. Then, the $N_2$ adsorption amount of the carbon material is detected by means of a thermal conductivity cell, and it is a method in which the specific surface area of the carbon material is calculated from such an adsorption isotherm assumed by means of the BET theory. Note that it has been know that the specific surface areas, found by the BET type adsorption method, become slightly higher values than the theoretical specific surface areas.

Moreover, the carbon material for absorbing hydrogen according to the present invention is such that the pore mode diameter of the pores, found by the BJH method, is arranged to be from 1 nm or more to 2 nm or less. Here, the way how to find the "pore mode diameter" will be described. The BJH method is a method in which, assuming that the shapes of pores are all cylindrical shapes, the pore distribution is found by means of the nitrogen adsorption method. Specifically, it is a method in which, under the relative pressure of nitrogen during adsorbing nitrogen onto or desorbing it from a sample, the adsorption isotherm is prepared from the nitrogen amount adsorbed onto the pores, or the desorption isotherm is prepared from the nitrogen amount eliminated from the pores, and the pore distribution is found from the adsorption or desorption isotherm. Note the form using the desorption isotherm is general. By finding, for example, the pore volume distribution of the pores of the carbon material, making a sample, by means of the BJH method, it is possible to find the pore mode diameter from the pore volume distribution with ease. Namely, the pore volume distribution is expressed as an accumulated pore volume distribution curve by plotting the pore diameters on the horizontal axis and the accumulated pore volumes on the vertical axis. Then, by finding a differential curve by differentiating the accumulated pore volume distribution curve, the pore diameters whose existing proportions are large appear as peaks. The pore diameter, corresponding to the maximum peak, makes the pore diameter whose existing proportion is the largest, namely, the pore mode diameter. In the present specification, the pore diameter, corresponding to the maximum peak in the aforementioned differential curve of the accumulated pore volume distribution, is employed as the pore mode diameter.

When the pore mode diameter is less than 1 nm, hydrogen molecules are less likely go into the pores so that the hydrogen storage capacity of the carbon material decreases. From the viewpoint of making hydrogen molecules likely to go into the pores so as to enlarge the hydrogen storage capacity, the pore mode diameter can desirably be 1.2 nm or more. Being 1.5 nm or more is further suitable. Moreover, when the pore mode diameter exceeds 2 nm, the useless spaces, which do not contribute to the adsorption of hydrogen molecules, increase in the pores so that the hydrogen storage capacity per unit volume of the carbon material decreases. As described above, hydrogen molecules adsorb onto the graphene surfaces forming the pore walls. Namely, in the pores, hydrogen molecules adsorb onto the pore walls. When the pore diameters are large, the spaces inside the pores are large to that extent so that the spaces, in which no hydrogen molecules exist, increase inside the pores. From the viewpoint of decreasing the spaces, which do not contribute to the adsorption of hydrogen molecules so as to further enlarge the hydrogen storage capacity per unit volume, the pore mode diameter can desirably be 1.9 nm or less.

By using the carbon material for absorbing hydrogen according to the present invention, it is possible to constitute a hydrogen storage apparatus which can be used at ordinary temperature, and whose hydrogen storage capacity per unit volume is large. In this case, the hydrogen storage apparatus can be constituted by including a container and a hydrogen storage material accommodated in the container, and the carbon material for absorbing hydrogen according to the present invention can be included in the hydrogen storage material. By accommodating the carbon material for absorbing hydrogen according to the present invention in the container to make a hydrogen storage apparatus, it is possible to store hydrogen in two states, such as compressed hydrogen and adsorbed hydrogen. Therefore, the hydrogen storage apparatus using the carbon material for absorbing hydrogen according to the present invention can be used, in addition to being less expensive relatively, at ordinary temperature, and makes an apparatus whose hydrogen storage capacity per unit volume is large.

The method of producing the aforementioned carbon material for absorbing hydrogen according to the present invention is not limited in particular. One of the suitable production methods will be hereinafter described. A suitable production method of the carbon material for absorbing hydrogen according to the present invention is constituted by including a raw-material mixture preparation step in which a carbonaceous substance and an alkali metal hydroxide are mixed to prepare a raw material mixture and an activation step in which the raw material mixture is heated at a temperature of from 650° C. or more to 850° C. or less. When a carbonaceous substance and an alkali metal hydroxide are mixed and heated, it is believed that alkali metal goes between the graphenes and graphenes, constituting the carbonaceous substance, so that it expands the openings between the graphenes. Namely, the carbonaceous substance is activated by the alkali metal hydroxide. Moreover, by arranging the heating temperature to be from 650° C. or more to 850° C. or less, it is possible to make the specific surface area and pore diameter of the carbon material, to be produced, into the objective ones. Thus, in accordance with the present production method, it is possible to produce the aforementioned carbon material for absorbing hydrogen according to the present invention with ease by adjusting the heating temperature in the activation step. Hereinafter, the description will be made for the respective steps in detail.

(1) Raw-Material Mixture Preparation Step

The present step is a step in which a carbonaceous substance and an alkali metal hydroxide are mixed to prepare a raw material mixture. The carbonaceous substance, making a raw material, is not limited in particular, for example, it is possible to use carbide of plants, coal coke, petroleum coke, mesocarbon microbeads (MCMB) generating in the carbonization process of pitches, phenol resins, phenol novolac resins, and the like. Among them, being low costs, the carbonaceous substance can desirably be one or more members selected from petroleum coke and mesocarbon microbeads (MCMB).

The alkali metal hydroxide plays a role of an activator for activating the aforementioned carbonaceous substance, as those which form intercalation compounds with carbon, it is possible to use potassium hydroxide, sodium hydroxide, lithium hydroxide, and the like. In particular, due to the reason that the resources are abundant and it is likely to form intercalation compound with carbon, it is desirable to use potassium hydroxide.

The mixing proportion of the carbonaceous substance and the alkali metal hydroxide is not limited in particular. In case of taking the yield into account, it is desirable to mix the carbonaceous substance and the alkali metal hydroxide with a proportion of 1:1–10 by weight ratio. To put it differently, it is desirable to mix the alkali metal hydroxide in an amount of from 1 time or more to 10 times or less of the carbonaceous substance by weight. This is because, in case of being less than 1 time, it can not fully perform the role as the activator. Note that it is further suitable that the mixing amount of the alkali metal hydroxide can be arranged to be 4 times or more with respect to the carbonaceous substance. On the other hand, even if it is mixed in an amount exceeding 10 times, the effect of activating the carbonaceous substance is not improved so much. It is further suitable that the mixing amount can be arranged to be 8 times or less.

Moreover, the mixing of the carbonaceous substance and the alkali metal hydroxide can be done by following ordinary powder mixing methods, for example, can be carried out by using a ball mill, a blender mixer, and the like.

(2) Activation Step

The present step is a step in which the raw material mixture, prepared in the raw-material mixture preparation step, is heated at a temperature of from 650° C. or more to 850° C. or less. When the heating temperature is less than 650° C., it is not possible to fully activate the carbonaceous substance, and it is not possible to make the specific surface area of the obtained carbon material into the aimed ones. Being arranged to be 700° C. or more, the alkali metal of the alkali metal hydroxide is likely to intercalated between the graphenes so that it is further suitable. On the other hand, when the heating temperature exceeds 850° C., the spaces, existing between the graphenes, expand too much to make the pore mode diameter of the obtained carbon material into the aimed ones. Being arranged to be 800° C. or less is further suitable. The heating time is not, as far as the carbon material can be fully activated, limited in particular, and can be arranged to be from 0.5 to 10 hours approximately. Note that the obtained carbon material for absorbing hydrogen can desirably be used after washing it with water to remove alkali contents.

Moreover, before the present step, a pre-treatment step can be included in which the raw material mixture is heated in advance. Namely, it is possible to make the production method of the carbon material for absorbing hydrogen according to the present invention into a mode which is constituted by including the raw-material mixture preparation step, the pre-treatment step and the activation step. In case of employing the present mode, the pre-treatment step can be made into a step in which the raw material mixture is heated at a temperature of from 300° C. to 500° C. approximately. By heating the raw material mixture in the present step before activating the carbonaceous substance, it is possible to uniformly mix the alkali metal hydroxide with the carbonaceous substance. The heating time can be arranged to be from 0.5 to 2 hours approximately.

Carbon-Based Hydrogen storage Material

A carbon-based hydrogen storage material, being a second hydrogen storage material, is such that it exhibits a specific surface area, being 1,000 m²/g or more, and a bulk density, being from 0.4 g/cm³ or more to 1 g/cm³ or less. In order to further increase the hydrogen storage capacity per unit volume, it is desired that the bulk density can be 0.5 g/cm³ or more. Moreover, due to the reason that when the spaces, existing between the graphenes, narrow, hydrogen molecules become less likely to go into them, it is further desired that the bulk density can be 0.7 g/cm³ or less. Note that, in the present specification, the value, calculated by the following technique, is employed as the bulk density. First of all, the carbon-based hydrogen storage material is formed as a cylinder shape, having a predetermined diameter, with a pressure of 0.1 MPa. Subsequently, by measuring the height of the formed cylinder, the volume of the formed carbon-based hydrogen storage material is found. The value, calculated by dividing the weight of the used carbon-based hydrogen storage material with the volume, is employed as the bulk density. Note that, when the carbon-based hydrogen storage material is massive, the bulk density shall be found by forming it into the aforementioned cylindrical shape after it is once pulverized.

The production method of the carbon-based hydrogen storage apparatus according to the present invention is not limited in particular. For example, as described above, it is possible produce it by treating a porous carbon material whose specific surface area is 1,000 m²/g or more by compression with a high pressure.

A porous carbon material used as the raw material is not, as far as the specific surface area is 1,000 m²/g or more, limited in particular. For example, it is possible to use activated carbon, carbon nano tubes, graphite nano fibers, and the like. Especially, due to the reason that the specific surface area is large, it is desirable to use activated carbon for the porous carbon material.

Moreover, the high-pressure compression treatment is not such that its conditions, methods, and the like, are limited in particular. For example, it can be carried out by compressing the aforementioned porous carbon material under predetermined pressure and temperature. In that case, it is desirable to arrange the treatment pressure to be from 100 MPa or more to 2,000 MPa. Being less than 100 MPa, the compressing force is so small that it is difficult to obtain the one having the aimed bulk density. Moreover, exceeding 2,000 MPa, the durability of the apparatus used in the treatment becomes a problem, and so forth, so that it is not practical. Especially, when activated carbon is used for the porous carbon material, due to the reason of having the compression effect fully exhibited, it is desirable to carry out the high-pressure compression treatment with 300 MPa or more. Moreover, taking the durability of forming mold into consideration, it is desirable to carry out the high-pressure compression treatment with a pressure of 1,300 MPa or less.

The high-pressure compression treatment can be carried out at room temperature, or can be carried out at a high temperature of up to about 200° C. Moreover, the treatment time is considered a time for holding, after reaching the aforementioned treatment pressure, the pressure, and can be arranged to be from a few seconds to 10 minutes approximately. The number of the treatments can be carried out, depending on the aforementioned porous carbon materials, treatment conditions and the like, from 1 time to 50 times approximately. The high-pressure compression treatment can be carried out, for example, by using a compression forming machine such as hydraulic presses. The porous carbon material is formed as a predetermined shape by the single high-pressure compression treatment. In case of carrying out the treatment 2 times or more, the formed porous carbon material can be used as it is, or can be pulverized for the every treatment to use in the next treatment. The pulverizing in this instance can be carried out, for instance, with a jet mill, a hammer mill, and so forth.

The carbon-based hydrogen storage material according to the present invention can employ a mode which further includes a binder. By including a binder, it has an advantage in that, in case of forming the carbon-based hydrogen storage material into a predetermined shape, the forming becomes easy and the like. The binder is such that the types are not limited in particular. For example, it is possible to use polytetrafluoroethylene (PTFE), polyvinylidene fluoride (PVDF), ethylene-propylene-diene copolymers, styrene-butadiene rubber, carboxy cellulose, and the like.

The carbon-based hydrogen storage material according to the present invention can desirably be used, similarly to hydrogen absorbing alloys and the like, after subjecting it to a heat treatment as an activation treatment before having hydrogen absorbed. Therefore, taking carrying out a heat treatment into consideration, in case of including a binder, it is necessary for the binder to exhibit certain heat resistance.

From such a viewpoint, among the above-exemplified ones, it is desirable to use polytetrafluoroethylene (PTFE), which has such an advantage in that it is highly heat-resistant and it can be formed again as it is after it is once pulverized, as the binder.

Moreover, it is desired that the content proportion of the binder can be 10% by weight or less when the weight of the carbon-based hydrogen storage material is taken as 100% by weight. The binder does not have a hydrogen absorbing-desorbing ability. Accordingly, this is because, when the content proportion of the binder exceeds 10% by weight, the hydrogen storage capacity of the carbon-based hydrogen storage material decreases.

The carbon-based hydrogen storage material according to the present invention of the aforementioned mode is also such that the production method is not limited in particular. For example, a carbon material, whose specific surface area is 1,000 m$^2$/g or more and bulk density is from 0.4 g/cm$^3$ or more to 1 g/cm$^3$ or less, can be mixed with a binder, and can be formed as a predetermined shape to make the carbon-based hydrogen storage material. Moreover, for instance, it can be obtained by mixing the aforementioned porous carbon material, whose specific surface area is 1,000 m$^2$/g or more, and a binder to prepare a raw material, and by treating the raw material by compression with a high pressure. The treatment conditions, treatment methods and the like in the high-pressure compression treatment of this case can conform to the above-described production method of the carbon-based hydrogen storage material according to the present invention.

By using the carbon-based hydrogen storage material according to the present invention, it is possible to constitute a hydrogen storage apparatus whose hydrogen storage capacity per unit volume is large. In this case, the hydrogen storage apparatus can be constituted by including a container and a hydrogen storage material accommodated in the container, and the carbon-based hydrogen storage material according to the present invention can be included in the hydrogen storage material. By accommodating the carbon-based hydrogen storage material according to the present invention in the container to make a hydrogen storage apparatus, it is possible to store hydrogen in two states, such as compressed hydrogen and adsorbed hydrogen. Therefore, the hydrogen storage apparatus using the carbon-based hydrogen storage material according to the present invention makes, in addition to being less expensive relatively, an apparatus whose hydrogen storage capacity per unit volume is large.

Hydrogen Storage Apparatus

The hydrogen storage apparatus according to the present invention is a hydrogen storage apparatus which includes a container and a hydrogen absorbing material accommodated in the container. The container is not, as far as it can be used under such conditions as low temperatures or high pressures, limited in particular, and various ones such as pressure resistant containers can be used. Then, the container is filled with a hydrogen absorbing material, including a porous carbon material and a hydrogen absorbing alloy, and has hydrogen absorbed-desorbed by adjusting the pressure or the temperature to predetermined conditions.

The hydrogen absorbing material accommodated in the container in the hydrogen storage apparatus according to the present invention is one which includes a porous carbon material whose specific surface area is 1,000 m$^2$ μg or more, and a hydrogen absorbing alloy. The porous carbon material is not, as far as the specific surface area is 1,000 m$^2$/g or more, limited in particular. As for the porous carbon material, for example, it is possible to use activated carbon, carbon nano tubes, graphite nano fibers, and the like. Especially, due to the reason that the specific surface area is large, it is desirable to use activated carbon for the porous carbon material. The activated carbon, whose specific surface area is 1,000 m$^2$/g or more, can be produced, for instance, by dispersing carbide such as plants, minerals and grain in an alkaline aqueous solution and by calcining it at a high temperature. Moreover, it is further suitable to employ the above-described carbon material for absorbing hydrogen according to the present invention or carbon-based hydrogen storage material according to the present invention as the porous carbon material. By using the carbon material for absorbing hydrogen according to the present invention as the porous carbon material, it is possible to constitute a hydrogen storage apparatus whose hydrogen storage capacity is large at ordinary temperature. Moreover, by using the carbon-based hydrogen storage material according to the present invention as the porous carbon material, it is possible to constitute a hydrogen storage apparatus whose hydrogen storage capacity per unit volume is large.

The hydrogen absorbing alloy as well is not such that its types are limited in particular. While taking the service conditions and the like of the hydrogen storage apparatus according to the present invention into consideration, it can be selected appropriately. For example, it is possible to name titanium-based alloys, rare-earth-based alloys, magnesium-based alloys, and so forth. Among them, due to the reason that the heat quantity generating in the hydrogen absorb-desorb is small because the heat of hydride formation is small, it is desirable to use either one or more members selected from titanium-based alloys and rare-earth-based alloys. Moreover, the aforementioned porous carbon material can desirably be used under a relatively high pressure. Taking this into consideration, it is desirable to use one whose hydrogen dissociation pressure is 0.1 MPa or more at 30° C. as the hydrogen absorbing alloy. Specifically, for instance, it is possible to name TiFe, LaNi$_5$, and so on. In addition, one whose hydrogen dissociation pressure is 0.5 MPa or more at 30° C. is further suitable.

Moreover, in case of taking using the hydrogen storage apparatus according to the present invention at a low temperature of –20° C. approximately into consideration, from the viewpoint of being capable of absorbing-desorbing a large amount of hydrogen at a low temperature, it is desirable to use a hydrogen absorbing alloy whose hydrogen dissociation pressure is 0.1 MPa or more at –20° C. For example, it is suitable to use either one or more members selected from titanium-chromium-based alloys and titanium-manganese-based alloys. Specifically, it is possible to name, as titanium-chromium-based alloy, TiCrMn, Ti$_{1.05}$CrMn, Ti$_{1.1}$CrMn, Ti$_{1.3}$Cr$_{0.4}$Mn$_{1.6}$, Ti$_{1.1}$Cr$_{0.7}$Mn$_{1.3}$, Ti$_{1.2}$Cr$_{0.8}$Mn$_{1.2}$, Ti$_{1.2}$CrMn, TiCr$_2$, Tr$_{1.2}$Cr$_{1.9}$Mn$_{0.1}$, Ti$_{1.2}$Cr$_{1.4}$Mn$_{0.6}$ and the like, and, as titanium-manganese-based alloys, TiMn$_{1.5}$, Ti$_{0.98}$Zr$_{0.02}$V$_{0.43}$Fe$_{0.09}$Cr$_{0.05}$Mn$_{1.5}$ and so forth. Note that titanium-based alloys, such as TiCrMn, including chromium and manganese with equal extent proportions, can be handled as a titanium-chromium-based alloy or a titanium-manganese-based alloy.

The content proportion of the hydrogen absorbing alloy in the hydrogen absorbing material is not limited in particular. From the viewpoint of enlarging the bulk density of the hydrogen absorbing material to increase the hydrogen storage capacity per unit volume, it is desirable to arrange the content proportion of the hydrogen absorbing alloy to be 10% by weight or more. It can further desirably be 30% by weight or more. Moreover, from the viewpoint of making the exothermic-endothermic heat quantities in absorbing-desorbing hydrogen smaller, it is desirable to arrange the content proportion of the hydrogen absorbing alloy to be 80% by weight or less. It can further desirably be 70% by weight or less. Considering these, the content proportion of the hydrogen absorbing alloy can desirably be from 10% by weight or more to 80% by weight or less. Note that titanium-chromium-based alloys and titanium-manganese-based alloys exhibit small exothermic heat quantities accompanied by the absorption of hydrogen. Accordingly, in case of using either one or more members selected from titanium-chromium-based alloys and titanium-manganese-based alloys, from the viewpoint of further increasing the hydrogen storage capacity, it is desirable to arrange the content proportion of the hydrogen absorbing alloy to be 90% by weight or less. In this case, taking both of the hydrogen storage capacity and exothermic heat quantity into consideration, the content proportion of the hydrogen absorbing alloy can desirably be from 30% by weight or more to 90% by weight or less. Moreover, arranging the content proportion of the hydrogen absorbing alloy to be 50% by weight or more to 90% by weight or more can be further suitable.

The hydrogen absorbing material, used in the hydrogen storage apparatus according to the present invention, can employ a mode which contains a binder, binding the aforementioned porous carbon material and hydrogen absorbing alloy. By containing a binder, it is possible to maintain a uniformly mixed state of the porous carbon material with the hydrogen absorbing alloy. Moreover, in case of forming the hydrogen absorbing material into a predetermined shape, there is an advantage in that the forming becomes easy. The binder is not such that its types are limited in particular. For example, it is possible to use fluorocarbon resins, such as polytetrafluoroethylene (PTFE), polychlorotrifluoroethylene (PCTFE) and polyvinylidene fluoride (PVDF), ethylene-propylene-diene copolymers, styrene-butadiene rubber, carboxy cellulose, and the like.

The hydrogen absorbing material can desirably be used after subjecting it to a heat treatment as an activation treatment before having hydrogen absorbed. Therefore, taking carrying out a heat treatment into consideration, in case of containing a binder, it is desired that the binder exhibits certain heat resistance. From such a viewpoint, among the above-exemplified ones, it is desirable to use fluorocarbon resins which have such an advantage in that their heat-resistance is high and it is much easier to form them. In particular, polytetrafluoroethylene (PTFE) is suitable because it can be mixed without using a solvent.

Moreover, the content proportion of the binder in the hydrogen absorbing material can desirably be 20% by weight or less. This is because the binder does not have a hydrogen absorb-desorb ability, and accordingly, when the content proportion of the binder exceeds 20% by weight, the hydrogen storage capacity of the hydrogen absorbing material decreases. It can further desirably be 5% by weight or less. Moreover, in order to effectively exhibit the aforementioned effect obtained by containing the binder, the content proportion can desirably be 0.2% by weight or more.

In addition, the hydrogen absorbing material can be obtained by being subjected to a high-pressure compression treatment. In this case, for example, only the porous carbon material can be subjected to a high-pressure compression treatment, or one in which the porous carbon material is mixed with the hydrogen absorbing alloy can be subjected to a high-pressure compression treatment. As described above, when a porous carbon material whose specific surface area is large is subjected to a high-pressure compression treatment, the spaces existing between the respective graphenes are compressed to contract, as a result, it is believed that it is possible to intend to make it highly dense. The high-pressure compression treatment is not such that the conditions, method and the like are limited in particular. For example, it can be carried out by compressing the aforementioned porous carbon material under predetermined pressure and temperature. In that case, it is desirable to arrange the treatment pressure to be from 100 MPa or more to 2,000 MPa or less. Being less than 100 MPa, the compressing force is so small that it is difficult to intend to make it sufficiently dense. Moreover, exceeding 2,000 MPa, the durability of the apparatus used in the treatment becomes a problem, and so forth, so that it is not practical. Especially, when activated carbon is used for the porous carbon material, due to the reason of having the compression effect fully exhibited, it is desirable to carry out the high-pressure compression treatment with 300 MPa or more. Moreover, taking the durability of forming mold into consideration, it is desirable to carry out the high-pressure compression treatment with a pressure of 1,300 MPa or less.

The high-pressure compression treatment can be carried out at room temperature, or can be carried out at a high temperature of up to about 200° C. Moreover, the treatment time is considered a time for holding, after reaching the aforementioned treatment pressure, the pressure, and can be arranged to be from a few seconds to 10 minutes approximately. The number of the treatments can be carried out, depending on the aforementioned porous carbon materials, treatment conditions and the like, from 1 time to 50 times approximately. The high-pressure compression treatment can be carried out, for example, by using a compression forming machine such as hydraulic presses. The hydrogen absorbing material can be formed as a predetermined shape by the single high-pressure compression treatment. In case of carrying out the treatment 2 times or more, the formed hydrogen absorbing material can be used as it is, or can be pulverized for the every treatment to use in the next treatment. The pulverizing in this instance can be carried out, for instance, with a jet mill, a hammer mill, and so forth.

The hydrogen absorbing material can be those which include the aforementioned porous carbon material and hydrogen absorbing alloy. For example, those can be used in which the powdered porous carbon material and the powdered hydrogen absorbing alloy are mixed to disperse the two. The mixing can be carried out, for instance, by using a ball mill, a rocking mill, and the like. The average particle diameter of hydrogen absorbing alloy particles, constituting the powder, is not limited in particular. When the average particle diameter of hydrogen absorbing alloy particles is large, the heat generation in absorbing hydrogen enlarges. Taking this into consideration, it is desirable to arrange the average particle diameter of hydrogen absorbing alloy particles to be 10 mm or less. Moreover, it is further desirable to arrange it to be 5 mm or less, and it is suitable to furthermore arrange it to be 3 mm or less. On the other hand, when the average particle diameter of hydrogen absorbing alloy particles is small, the hydrogen storage capacity lessens. Taking this into consideration, it is desirable to arrange the average particle diameter of hydrogen absorbing alloy particles to be 1 μm or more. Moreover, it is further desirable to arrange it to be 10 μm or more, and it is suitable to furthermore arrange it to be 100 μm or more.

Moreover, as the hydrogen absorbing material, it is also possible to use those which are made into composites by bonding the independent particles of the aforementioned powdered porous carbon material and powdered hydrogen absorbing alloy by means of mechanical shearing force. In this case, for example, the porous carbon material can be composited with the hydrogen absorbing alloy by methods such as mechanical alloying and mechano-fusion.

In addition, it is also possible to use those, in which mixed materials of the porous carbon material and hydrogen absorbing alloy are formed as a sheet shape, as the hydrogen absorbing material. In this case, when the mode is employed in which a binder is contained in the hydrogen absorbing material, the forming becomes easy so that it is suitable. For example, a mixed material is prepared in which the porous carbon material and hydrogen absorbing alloy are mixed with a binder, and the mixture is formed as a sheet shape by rolling. Then, the sheet can be wound as a spiral shape, and can be accommodated as the hydrogen absorbing material in a container to constitute the hydrogen storage apparatus. Moreover, the porous carbon material and hydrogen absorbing alloy with a binder mixed can be formed as a sheet, respectively, and one, in which the respective sheets are laminated alternately, can be accommodated as the hydrogen absorbing material in a container to constitute the hydrogen storage apparatus.

The above-described embodiment modes are only a few of embodiment modes, and the carbon material for absorbing hydrogen, carbon-based hydrogen storage material, hydrogen storage apparatus according to the present invention are not limited to the aforementioned embodiment modes. It is possible to carry out the carbon material for absorbing hydrogen, carbon-based hydrogen storage material, hydrogen storage apparatus according to the present invention, beginning with the aforementioned embodiment modes, in various modes being subjected to modifications and improvements and the like which a person having ordinary skill in the art can carry out.

EXPERIMENTAL EXAMPLE

Experimental Example 1

Based on the aforementioned embodiment modes, the carbon material for absorbing hydrogen according to the present invention, being the first hydrogen storage material, was produced variously. Then, the produced carbon materials for absorbing hydrogen were accommodated in containers to constitute hydrogen storage apparatuses, and their hydrogen storage capacities were measured. Hereinafter, descriptions will be made on the production of the carbon materials for absorbing hydrogen and the measurement results of the hydrogen storage capacities of the hydrogen storage apparatuses.

(A) Production of Carbon Materials for Absorbing Hydrogen (1) Carbon Material of #11

As the carbonaceous substance, petroleum coke, and, as the alkali metal hydroxide, potassium hydroxide hydrate (water content about 15%) were used, respectively. The petroleum coke and the potassium hydroxide were mixed with a proportion of 1:5 by weight ratio to prepare a raw material mixture. This raw material mixture was heated, as the pre-treatment, at a temperature of from 300° C. to 500° C. for 1 hour. Thereafter, the raw material mixture was heated at a temperature of 700° C., and was held for 6 hours to activate it. After activating it, it was cooled, washed with water and dried to obtain a carbon material.

The specific surface area and pore mode diameter of the obtained carbon material were measured by the above-described methods. The measuring apparatus was such that Autosorb-1 made by Quantachrome Co., Ltd. was used. The specific surface area of the present carbon material was 3,200 $m^2/g$, and the pore mode diameter was 1.5 nm. The present carbon material was one which made the carbon material for absorbing hydrogen according to the present invention, and was numbered as the carbon material of #11.

(2) Carbon Material of #12

In the production method of the aforementioned carbon material of #11, except that the temperature of activation was changed to 750° C., a carbon material was produced in the same manner as the carbon material of #11. Then, the specific surface area and pore mode diameter of the obtained carbon material were measured by using the same measuring apparatus as aforementioned. As a result, the specific surface area of the present carbon material was 3,300 $m^2/g$, and the pore mode diameter was 1.7 nm. The present carbon material was one which made the carbon material for absorbing hydrogen according to the present invention, and was numbered as the carbon material of #12.

(3) Carbon Material of #13

As the carbonaceous substance, MCMB (particle diameter 25 μm) was used, and, as the alkali metal hydroxide, potassium hydroxide was used, respectively. The MCMB and the potassium hydroxide were mixed with a proportion of 1:4 by weight ratio to prepare a raw material mixture. This raw material mixture was compounded, as the pre-treatment, while holding it at a temperature of 500° C. for 1 hour. Thereafter, the raw material mixture was heated at a temperature of 800° C., and was held for 6 hours to activate it. After activating it, it was cooled, washed with water and dried to obtain a carbon material.

The specific surface area and pore mode diameter of the obtained carbon material were measured by using the same measuring apparatus as aforementioned. As a result, the specific surface area of the present carbon material was 3,200 $m^2/g$, and the pore mode diameter was 1.9 nm. The present carbon material was one which made the carbon material for absorbing hydrogen according to the present invention, and was numbered as the carbon material of #13.

(4) Carbon Material of #21

In the production method of the aforementioned carbon material of #11, except that the temperature of activation was changed to 550° C., a carbon material was produced in the same manner as the carbon material of #11. Then, the specific surface area and pore mode diameter of the obtained carbon material were measured by using the same measuring apparatus as aforementioned. As a result, the specific surface area of the present carbon material was 2,400 $m^2/g$, and the pore mode diameter was 1.6 nm. The present carbon material was numbered as the carbon material of #21.

(5) Carbon Material of #22

In the production method of the aforementioned carbon material of #13, except that the temperature of activation was changed to 550° C., a carbon material was produced in the same manner as the carbon material of #13. Then, the specific surface area and pore mode diameter of the obtained carbon material were measured by using the same measuring apparatus as aforementioned. As a result, the specific surface area of the present carbon material was 2,000 m²/g, and the pore mode diameter was 1.5 nm. The present carbon material was numbered as the carbon material of #22.

(6) Carbon Material of #23

In the production method of the aforementioned carbon material of #13, except that the temperature of activation was changed to 500° C., a carbon material was produced in the same manner as the carbon material of #13. Then, the specific surface area and pore mode diameter of the obtained carbon material were measured by using the same measuring apparatus as aforementioned. As a result, the specific surface area of the present carbon material was 1,200 m²/g, and the pore mode diameter was less than 1 nm. The present carbon material was numbered as the carbon material of #23.

(7) Carbon Material of #24

In the production method of the aforementioned carbon material of #13, except that the temperature of activation was changed to 900° C., a carbon material was produced in the same manner as the carbon material of #13. Then, the specific surface area and pore mode diameter of the obtained carbon material were measured by using the same measuring apparatus as aforementioned. As a result, the specific surface area of the present carbon material was 3,000 m²/g, and the pore mode diameter was 2.1 nm. The present carbon material was numbered as the carbon material of #24.

(B) Hydrogen Storage Capacity Measurement on Hydrogen Storage Apparatuses

Each of the carbon materials produced as aforementioned was accommodated in a high pressure bomb whose inner capacity was 136 L to manufacture a hydrogen storage apparatus. Note that the number of the accommodated carbon material was made into the number of the respective hydrogen apparatuses as it is. These hydrogen storage apparatuses were filled with hydrogen at ordinary temperature, and were pressurized to respective pressures of 10 MPa, 25 MPa and 35 MPa, and the hydrogen storage capacities under the respective pressures were found. Meanwhile, as a reference example, an empty high pressure bomb (inner capacity 136 L) was filled with hydrogen, and the hydrogen storage capacities under the respective pressures were found in the same manner as aforementioned. Note that the hydrogen storage capacities were such that the desorbed hydrogen amounts were measured by using a wet type gas meter (W-NK-10 made by Shinagawa Co., Ltd.). In Table 1, there are set forth the specific surface areas and pore mode diameters of the carbon materials, accommodated in the respective hydrogen storage apparatuses, and the hydrogen storage capacities of the respective hydrogen storage apparatuses as well as the bomb of the reference example under the respective pressures. Note that, in Table 1, the hydrogen storage capacities are set forth as the weights of hydrogen stored per 100 L capacity of the respective hydrogen storage apparatuses and bomb.

TABLE 1

| Hydrogen Storage Apparatus | Carbon Material | | Hydrogen Storage Capacity (kg/100 L) | | |
|---|---|---|---|---|---|
| | Specific Surface Area (m²/g) | Pore Mode Diameter (nm) | 10 MPa | 25 MPa | 35 MPa |
| #11 | 3,200 | 1.5 | 1.01 | 2.08 | 2.59 |
| #12 | 3,300 | 1.7 | 0.96 | 1.98 | 2.55 |
| #13 | 3,200 | 1.9 | 0.89 | 1.90 | 2.48 |
| #21 | 2,400 | 1.6 | 0.82 | 1.79 | 2.29 |
| #22 | 2,000 | 1.5 | 0.83 | 1.76 | 2.26 |
| #23 | 1,200 | Less than 1 | 0.82 | 1.72 | 2.20 |
| #24 | 3,000 | 2.1 | 0.84 | 1.78 | 2.32 |
| Bomb | — | — | 0.75 | 1.71 | 2.27 |

From Table 1, including the bomb of the reference example, in all of the hydrogen storage apparatuses, the larger the pressure is the larger the hydrogen storage capacity is. Then, it is understood that the hydrogen storage apparatuses of #11 through #13, in which the carbon materials of #11 through #13 being the carbon material for absorbing hydrogen according to the present invention were accommodated, are such that the hydrogen storage capacities are larger under every pressure than the other hydrogen storage apparatuses of #21 through #24 and the bomb filled with hydrogen. Taking the instance in which the pressure is 10 MPa as an example, in the hydrogen storage apparatuses of #11 through #13, the hydrogen storage capacities are from 0.89 to 1.01 (kg/100 L), on the other hand, in the hydrogen storage apparatuses of #21 through #24 and the bomb, they are from 0.75 to 0.84 (kg/100 L). Namely, the hydrogen storage apparatus using the carbon material for absorbing hydrogen according to the present invention is such that the hydrogen storage capacity is increased by about 35% maximally. This results from the fact that the hydrogen storage capacity per unit volume at ordinary temperature is enlarged because the carbon material for absorbing hydrogen according to the present invention is used, carbon material whose specific surface area is as large as 3,200 m²/g or more and pore mode diameter is from 1.5 to 1.9 nm. Note that it is believed that the carbon materials of #21 through #24 accommodated in the hydrogen storage apparatuses of #21 through #24 are such that the values of the specific surface area and pore mode diameter did not became those within the aimed ranges because the activation step in the production process was not carried out at the proper temperature. From the above, it was possible to confirm that the carbon material for absorbing hydrogen according to the present invention is such that the hydrogen storage capacity per unit volume at ordinary temperature is large.

Experimental Example 2

Based on the aforementioned embodiment modes, the carbon-based hydrogen storage material according to the present invention, being the second hydrogen storage material, was manufactured variously, and the hydrogen storage capacities were measured. Hereinafter, descriptions will be made on the production of the carbon-based hydrogen storage materials and the measurement results of the hydrogen storage capacities.

(A) Production of Carbon-Based Hydrogen Storage Materials

Porous carbon materials, having a variety of specific surface areas, and a binder were mixed to make raw materials, and the raw materials were subjected to a high-pressure compression treatment at a variety of pressures to produce carbon-based hydrogen storage materials. Note that part of them were such that only the porous carbon materials were subjected to the high-pressure compression treatment to produce the carbon-based hydrogen storage materials.

A variety of activated carbons were used as the porous carbon material, and PTFE was used as the binder. First, 0.294 g of an activated carbon was mixed with 0.006 g of PTFE to prepare a raw material. Moreover, similarly, 0.27 g of an activated carbon was mixed with 0.03 g of PTFE to prepare a raw material. Subsequently, these raw materials were subjected to a high-pressure compression treatment by a compression forming machine to obtain carbon-based hydrogen storage materials, formed as a cylinder shape having a diameter of about 16 mm. The high-pressure compression treatment was carried out at room temperature, and was carried out by changing the treatment pressure in a range of from 321 to 1,240 MPa variously and moreover changing the number of treatments in a range from 1 to 20 times variously. Note that, in case of treating 2 times or more, the formed raw material was once pulverized after the 1-time treatment of the raw material was completed, and the next treatment was carried out. The specific surface areas and bulk densities of the activated carbons of the raw materials as well as those of the obtained carbon-based hydrogen storage materials were measured by the above-described method. Note that the carbon-based hydrogen storage materials, containing the binder, were such that the content proportions of the binder are as small as about 10% by weight maximally. Accordingly, it is believed that the binder influences less the bulk density, and the like. In Table 1, there are set forth the specific surface areas and bulk densities of the activated carbons, the high-pressure compression treatment conditions, the specific surface areas and bulk densities of the obtained carbon-based hydrogen storage materials, and so forth, altogether.

TABLE 2

| Porous Carbon Material | Sample No. | Conditions of High-Pressure Compression Treatment | | | After High-Pressure Compression Treatment | |
|---|---|---|---|---|---|---|
| | | Binder (% by Weight) | Treatment Pressure (MPa) | Number of Treatments (Time) | Specific Surface Area ($m^2/g$) | Bulk Density ($g/cm^3$) |
| Super Activated Carbon M30 (Made by Osaka Gas Chemical Co., Ltd.) Specific Surface Area 3,220 ($m^2/g$) Apparent Density 0.199 ($g/cm^3$) | #11 | 2 | 1,240 | 1 | 2,600 | 0.430 |
| | #12 | 2 | 734 | 5 | 2,100 | 0.520 |
| | #13 | — | 734 | 7 | 2,100 | 0.520 |
| | #14 | 2 | 734 | 14 | 1,600 | 0.670 |
| | #15 | 2 | 734 | 15 | 1,240 | 0.803 |
| | #16 | 2 | 734 | 20 | 1,200 | 0.834 |
| | #17 | 10 | 734 | 1 | 1,800 | 0.503 |
| Super Activated Carbon 30-SPD (Made by Kansai Netsu Kagaku Co., Ltd.) Specific Surface Area 3,250 ($m^2/g$) Apparent Density 0.237 ($g/cm^3$) | #21 | 2 | 734 | 1 | 2,700 | 0.427 |
| | #22 | 2 | 734 | 5 | 1,300 | 0.710 |
| | #23 | 2 | 734 | 20 | 1,150 | 0.960 |
| | — | — | — | — | — | — |
| Super Activated Carbon 20-SPD (Made by Kansai Netsu Kagaku Co., Ltd.) Specific Surface Area 2,290 ($m^2/g$) Apparent Density 0.316 ($g/cm^3$) | #31 | 2 | 734 | 1 | 2,200 | 0.480 |
| | #32 | 2 | 734 | 5 | 1,400 | 0.678 |
| | #33 | 2 | 734 | 20 | 1,300 | 0.891 |
| | — | — | — | — | — | — |
| Super Activated Carbon M20 (Made by Osaka Gas Chemical Co., Ltd.) Specific Surface Area 2,090 ($m^2/g$) Apparent Density 0.327 ($g/cm^3$) | #41 | 2 | 734 | 5 | 1,300 | 0.645 |
| | #42 | 2 | 734 | 20 | 1,120 | 0.900 |
| | — | — | — | — | — | — |
| Super Activated Carbon M15 (Made by Osaka Gas Chemical Co., Ltd.) Specific Surface Area 1,390 ($m^2/g$) Apparent Density 0.377 ($g/cm^3$) | #51 | 2 | 734 | 1 | 1,400 | 0.659 |
| | #52 | 2 | 734 | 5 | 1,200 | 0.815 |
| | #53 | 2 | 734 | 20 | 1,160 | 0.913 |
| | — | — | — | — | — | — |

From Table 2, the activated carbons used as the porous carbon material were such that the bulk densities were from 0.199 to 0.377 g/cm$^3$, on the other hand, those subjected to the high-pressure compression treatment, i.e., all the carbon-based hydrogen storage materials according to the present invention were such that the bulk densities enlarged larger than the activated carbons, i.e., the raw materials of each, and become from 0.427 to 0.960 g/cm$^3$. Moreover, it is understood that, when the treatment pressure in the high-pressure compression treatment is the same, the more the number of the treatments is the larger the bulk density is. Note that the specific surface area was seen to show a slightly lessening tendency.

(B) Measurement of Hydrogen Storage Capacity

Next, the hydrogen storage capacities of the produced carbon-based hydrogen storage materials were measured at a predetermined temperature and pressure. Note that, also regarding the porous carbon materials before subjecting to the high-pressure compression treatment, the hydrogen storage capacities were measured similarly. The hydrogen storage capacities were found, based on the pressure-composition isotherms (PCT lines), by means of the capacity method (JIS H 7201-1991). As the measurement results of the hydrogen storage capacities, in Table 3, there are set forth the results obtained by absorbing hydrogen at the liquid nitrogen temperature, and moreover, in Table 4, there are set forth the results obtained by absorbing hydrogen at room temperature. As reference examples, in the respective tables, there are also set forth the results of measuring the hydrogen storage capacities of activated carbon, whose specific surface area was less than 1,000 m$^2$/g, as well as the hydrogen storage capacities of an aluminum oxide porous bulk, in which coke was composited, altogether. Note that, in Table 3 and Table 4, the hydrogen storage capacities are set forth as the weights of hydrogen absorbed per 100 L of each of the respective carbon-based hydrogen storage materials, the respective porous carbon materials, the activated carbon, whose specific surface area was less than 1,000 m$^2$/g, and the aluminum oxide porous bulk, in which coke was composited.

TABLE 3

| | Porous Carbon Material | | | Carbon-Based | Hydrogen Storage | | Carbon-Based Hydrogen Storage Material's |
|---|---|---|---|---|---|---|---|
| | | | Hydrogen Storage | Hydrogen Storage | Capacity Measurement Conditions | | Hydrogen Storage |
| Type | Measurement Conditions | Capacity (kg/100 L) | | Material Sample No. | Pressure (MPa) | Temp. (° C.) | Capacity (kg/100 L) |
| Super Activated Carbon M30 | Pressure (MPa) 1.85 Temp. (° C.) −196 | 1.01 | | #11 #12 #13 #14 #16 | 2.27 1.96 2.08 1.93 1.81 | −196 −196 −196 −196 −196 | 1.98 2.00 1.96 2.10 2.33 |
| Super Activated Carbon 30-SPD | Pressure (MPa) 2.11 Temp. (° C.) −196 | 1.21 | | #21 #22 #23 — | 1.95 2.13 2.21 — | −196 −196 −196 — | 2.18 2.32 2.12 — |
| Super Activated Carbon 20-SPD | Pressure (MPa) 1.75 Temp. (° C.) −196 | 1.14 | | #31 #32 #33 — | 2.01 1.87 2.19 — | −196 −196 −196 — | 1.93 2.15 1.95 — |
| Super Activated Carbon M20 | Pressure (MPa) 1.92 Temp. (° C.) −196 | 1.04 | | #41 #42 — — | 2.10 2.23 — — | −196 −196 — — | 2.19 1.90 — — |
| Super Activated Carbon M15 | Pressure (MPa) 1.91 Temp. (° C.) −196 | 1.31 | | #51 #52 #53 — | 1.88 1.80 2.03 — | −196 −196 −196 — | 2.10 2.33 2.40 — |
| Activated Carbon TG (Made by Futamura Kagaku Co., Ltd.) | Specific Surface Area 770 (m$^2$/g), Bulk Density 0.578 (g/cm$^3$) Hydrogen Occlusion Amount 1.46 (kg/100 L) [Pressure 1.96 (MPa), Temp. −196 (° C.)] | | | | | | |
| Activated Carbon MK-80 (Cataler Kogyo Co., Ltd.) | Specific Surface Area 410 (m$^2$/g), Bulk Density 0.630 (g/cm$^3$) Hydrogen Occlusion Amount 0.865 (kg/100 L) [Pressure 2.04 (MPa), Temp. −196 (° C.)] | | | | | | |
| Aluminum Oxide Porous Bulk with Coke Composited | Bulk Density 0.560 (g/cm$^3$) Hydrogen Occlusion Amount 1.01 (kg/100 L) [Pressure 2.04 (MPa), Temp. −196 (° C.)] | | | | | | |

*The hydrogen storage capacities are the weights of hydrogen stored per 100 L of each of the respective carbon-based hydrogen storage materials, the respective porous carbon materials, the activated carbon and the aluminum oxide porous bulk with coke composited.

TABLE 4

| Type | Porous Carbon Material Measurement Conditions | Porous Carbon Material Hydrogen Storage Capacity (kg/100 L) | Carbon-Based Hydrogen Storage Material Sample No. | Hydrogen Storage Capacity Measurement Conditions Pressure (MPa) | Hydrogen Storage Capacity Measurement Conditions Temp. (° C.) | Carbon-Based Hydrogen Storage Material's Hydrogen Storage Capacity (kg/100 L) |
|---|---|---|---|---|---|---|
| Super Activated Carbon M30 | Pressure (MPa) 10 Temp. (° C.) 21 | 0.235 | #11 | 10 | 19 | 0.464 |
| | | | #12 | 10 | 22 | 0.626 |
| | | | #13 | 10 | 21 | 0.600 |
| | | | #14 | 10 | 24 | 0.647 |
| | | | #15 | 10 | 24 | 0.803 |
| | | | #16 | 10 | 21 | 0.834 |
| | | | #17 | 10 | 22 | 0.503 |
| Super Activated Carbon 30-SPD | Pressure (MPa) 10 Temp. (° C.) 23 | 0.289 | #21 | 10 | 23 | 0.454 |
| | | | #22 | 10 | 20 | 0.639 |
| | | | #23 | 10 | 23 | 0.740 |
| | | | — | — | — | — |
| Super Activated Carbon 20-SPD | Pressure (MPa) 10 Temp. (° C.) 23 | 0.302 | #31 | 10 | 24 | 0.484 |
| | | | #32 | 10 | 22 | 0.665 |
| | | | #33 | 10 | 22 | 0.586 |
| | | | — | — | — | — |
| Super Activated Carbon M20 | Pressure (MPa) 10 Temp. (° C.) 23 | 0.256 | #41 | 10 | 21 | 0.490 |
| | | | #42 | 10 | 21 | 0.645 |
| | | | — | — | — | — |
| Super Activated Carbon M15 | Pressure (MPa) 10 Temp. (° C.) 23 | 0.368 | #51 | 10 | 22 | 0.637 |
| | | | #52 | 10 | 25 | 0.666 |
| | | | #53 | 10 | 20 | 0.735 |
| | | | — | — | — | — |
| Activated Carbon TG (Made by Futamura Kagaku Co., Ltd.) | Specific Surface Area 770 (m²/g), Bulk Density 0.578 (g/cm³) Hydrogen Occlusion Amount 0.392 (kg/100 L) [Pressure 10 (MPa), Temp. 23 (° C.)] | | | | | |
| Activated Carbon MK-80 (Cataler Kogyo Co., Ltd.) | Specific Surface Area 410 (m²/g), Bulk Density 0.630 (g/cm³) Hydrogen Occlusion Amount 0.198 (kg/100 L) [Pressure 10 (MPa), Temp. 23 (° C.)] | | | | | |
| Aluminum Oxide Porous Bulk with Coke Composited | Bulk Density 0.560 (g/cm³) Hydrogen Occlusion Amount 0.188 (kg/100 L) [Pressure 10 (MPa), Temp. 23 (° C.)] | | | | | |

*The hydrogen storage capacities are the weights of hydrogen stored per 100 L of each of the respective carbon-based hydrogen storage materials, the respective porous carbon materials, the activated carbon and the aluminum oxide porous bulk with coke composited.

From Table 3, the activated carbons, to which the high-pressure compression treatment was not carried out, and the aluminum oxide porous bulk, composited with coke, were such that the hydrogen storage capacities at the liquid nitrogen temperature were from 0.87 to 1.46 kg/100 L. On the other hand, the hydrogen storage capacities of the carbon-based hydrogen storage materials according to the present invention enlarged so that they were from 1.90 to 2.40 kg/100 L. Moreover, it is understood that, although the carbon-based hydrogen storage material of #13 do not contain the binder, the hydrogen storage capacity does not differ, compared to the other carbon-based hydrogen storage materials. Similarly, from Table 4, the activated carbons, to which the high-pressure compression treatment was not carried out, and the aluminum oxide porous bulk, composited with coke, were such that the hydrogen storage capacities at room temperature were from 0.188 to 0.392 kg/100 L, on the other hand, the hydrogen storage capacities of the carbon-based hydrogen storage materials according to the present invention enlarged so that they were from 0.454 to 0.834 kg/100 L. Therefore, it was possible to confirm that the carbon-based hydrogen storage material according to the present invention is such that the bulk density is large, and that, although there are differences depending on the temperatures and pressure conditions at which hydrogen is absorbed, the hydrogen storage capacity per unit volume is large.

Moreover, a high pressure bomb was filled with the aforementioned carbon-based hydrogen storage material of #14 and was further filled with hydrogen, and the high pressure bomb was pressurized to respective predetermined pressures of 10 MPa, 25 MPa and 35 MPa. Then, by measuring the hydrogen desorb capacities with a Micro Motion flowmeter, the hydrogen storage capacities under the respective pressures were found. Similarly, a high pressure bomb was filled with the activated carbon (M30), being the raw material of the carbon-based hydrogen storage material of #14, and the hydrogen storage capacities under the aforementioned respective pressures were found. Furthermore, a high pressure bomb was filled with hydrogen, and the hydrogen storage capacities under the aforementioned respective pressures were found. In Table 5, there are set forth the hydrogen storage capacities under the respective pressures. Note that, in Table 5, the hydrogen storage capacities are set forth as the weights of hydrogen absorbed per 100 L capacity of the respective hydrogen bombs.

TABLE 5

| Type of Bomb | Hydrogen Storage Capacity (kg/100 L) | | |
|---|---|---|---|
| | 10 MPa | 25 MPa | 35 MPa |
| Carbon-Based Hydrogen Storage Material (#14) | 1.10 | 2.27 | 2.82 |
| Activated Carbon (M30) | 0.88 | 1.91 | 2.45 |
| Hydrogen | 0.75 | 1.71 | 2.27 |

From Table 5, in all of the bombs, the larger the pressure is the larger the hydrogen storage capacity is. Moreover, it is understood that the bomb filled with the carbon-based hydrogen storage material of #14 is such that, regardless of the pressures, the hydrogen storage capacities are larger than the bomb filled with the activated carbon of the raw material as well as the bomb filled with hydrogen. Namely, the hydrogen storage capacities of the bomb filled with the carbon-based hydrogen storage material of #14 enlarged by from 15 to 24% more than the bomb filled with the activated carbon of the raw material, and was enlarged by from 24 to 47% more than the bomb filled with hydrogen. Therefore, it was possible to confirm that the hydrogen storage apparatus including the carbon-based hydrogen storage material according to the present invention makes a hydrogen storage apparatus whose hydrogen storage capacity per unit volume is large.

Experimental Example 3

Based on the aforementioned embodiment modes, hydrogen absorbing materials, used in the hydrogen storage apparatus according to the present invention, were produced variously, and the hydrogen storage capacities and the like of each of them were measured. Hereinafter, descriptions will be made on the production of the hydrogen absorbing materials, the measurement of the hydrogen storage capacities, and so forth.

(1) Hydrogen Absorbing Material of First Series (a) Production of Hydrogen Absorbing Material As the porous carbon material, activated carbon M30 (brand name, made by Osaka Gas Chemical Co., Ltd.), whose specific surface area was 3,220 $m^2/g$, was used, as the hydrogen absorbing alloy, $LaNi_5$ (average particle diameter about 300 μm) or TiFe (average particle diameter about 500 μm) was used to produce hydrogen absorbing materials. First, adsorbed moisture and the like were removed by heat-treating activated carbon M30. The heat treatment was carried out by holding activated carbon M30 in a hydrogen atmosphere at 300° C. for 1 hour. Similarly, the hydrogen absorbing alloys were subjected to an activation treatment. The activation treatment was such that, regarding $LaNi_5$, a treatment was repeated 3 times in which it was heated to 300° C. under a pressure of 5 MPa in a hydrogen atmosphere, was held thereat for 1 hour, and was returned back to ordinary temperature. Regarding TiFe, only the temperature was changed to 450° C., and it was carried out in the same manner as the aforementioned $LaNi_5$. Then, heat-treated activated carbon M30 and activated $LaNi_5$ were mixed so as to make 1:1 by weight ratio to obtain a hydrogen absorbing material, comprising M30 and $LaNi_5$, (hereinafter referred to as "hydrogen absorbing material M30/$LaNi_5$"). The mixing was carried out by using a mortar in an argon atmosphere for about 5 minutes. Similarly, activated carbon M30 and TiFe were mixed so as to make 1:1 by weight ratio to obtain hydrogen absorbing material M30/TiFe. With respect to the obtained hydrogen absorbing materials, each of them was subjected to the activation treatment under the same conditions as the activation treatments which were carried out to the containing hydrogen absorbing alloys.

(b) Measurement of Hydrogen Storage Capacity

With respect to the produced respective hydrogen absorbing materials, the bulk densities and the hydrogen storage capacities at a temperature of 25° C. under a pressure of 9 MPa were measured, respectively. Moreover, with respect to activated carbon M30, $LaNi_5$ and TiFe, being hydrogen absorbing alloys, as well, the bulk densities and the hydrogen storage capacities were measured similarly. Note that, in the present preferred embodiment, as the bulk densities, values are employed which are calculated by forming the hydrogen absorbing materials and the like as a cylinder shape having a predetermined diameter with a pressure of 0.1 MPa, by finding the volumes by measuring the heights of the formed cylindrical hydrogen absorbing materials and so forth, and by dividing the weights of the used hydrogen absorbing materials and so on with the volumes. Moreover, as reference examples, with respect to 4 types of ones as well, i.e., graphitized mesocarbon microbead (graphitized MCMB) being a carbon material other than the porous carbon material and exhibiting a specific surface area being 10 $m^2/g$, MCMB/$LaNi_5$ in which the MCMB and $LaNi_5$ were mixed with 1:1 by weight ratio, a silica porous bulk not being the porous carbon material but exhibiting a specific surface area being 1,000 $m^2/g$, and MCMB/$LaNi_5$ in which the porous silica bulk and $LaNi_5$ were mixed with 1:1 by weight ratio, the hydrogen storage capacities and the like were measured similarly. The hydrogen storage capacities were found, based on the pressure-composition isotherms (PCT lines), by means of the capacity method (JIS H 7201-1991). Moreover, each of the aforementioned samples was filled in a sample tube whose capacity was 5 ml, and the temperature increment of the sample tube surface accompanied by hydrogen absorb was also measured by pressurizing with 5 MPa hydrogen. In Table 6, there are set forth the measurement results of the hydrogen storage capacities and temperature increments, and so forth.

TABLE 6

| | Bulk Density (g/$cm^3$) | True Density (g/$cm^3$) | Hydrogen Storage Capacity (% by Weight) | Temp. Increment (° C.) |
|---|---|---|---|---|
| Activated Carbon M30 Specific Surface Area 3,220 ($m^2/g$) | 0.20 | 2.0 | 1.0 | 2 |

TABLE 6-continued

| | Bulk Density (g/cm³) | True Density (g/cm³) | Hydrogen Storage Capacity (% by Weight) | Temp. Increment (° C.) |
|---|---|---|---|---|
| Hydrogen Absorbing Alloy LaNi$_5$ | 4.00 | 8.2 | 1.4 | 43 |
| Hydrogen Absorbing Alloy TiFe | 3.00 | 6.0 | 1.5 | 33 |
| Hydrogen Absorbing Material M30/LaNi$_5$ | 0.45 | 3.2 | 1.2 | 7 |
| Hydrogen Absorbing Material M30/TiFe | 0.38 | 3.0 | 1.3 | 6 |
| MCMB Specific Surface Area 10 (m²/g) | 0.20 | 2.0 | 0.1 | 2 |
| Silica Porous Bulk Specific Surface Area 1,000 (m²/g) | 0.21 | 2.2 | 0.3 | 7 |
| MCMB/LaNi$_5$ | 0.45 | 3.2 | 0.7 | 15 |
| Silica Porous Bulk/LaNi$_5$ | 0.48 | 3.3 | 0.8 | 18 |

From Table 6, it is understood that all of the hydrogen absorbing materials were such that the bulk densities are doubled approximately so that the bulk densities are heightened, compared to the case where activated carbon M30 was used independently. Then, the temperature increments, accompanied by the hydrogen absorb of the hydrogen absorbing materials, are extremely small, compared to the case where the hydrogen absorbing alloys were used independently. Moreover, the hydrogen storage capacities of the hydrogen absorbing materials are enlarged, compared to the case where the hydrogen absorbing alloys were used independently. Note that all of those in which the MCMB and silica porous bulk, not being the porous carbon material, were mixed with the hydrogen absorbing alloys are such that the hydrogen storage capacities are small and the temperature increments, accompanied by hydrogen absorb, are enlarged, compared to the hydrogen absorbing materials.

Figure 3:
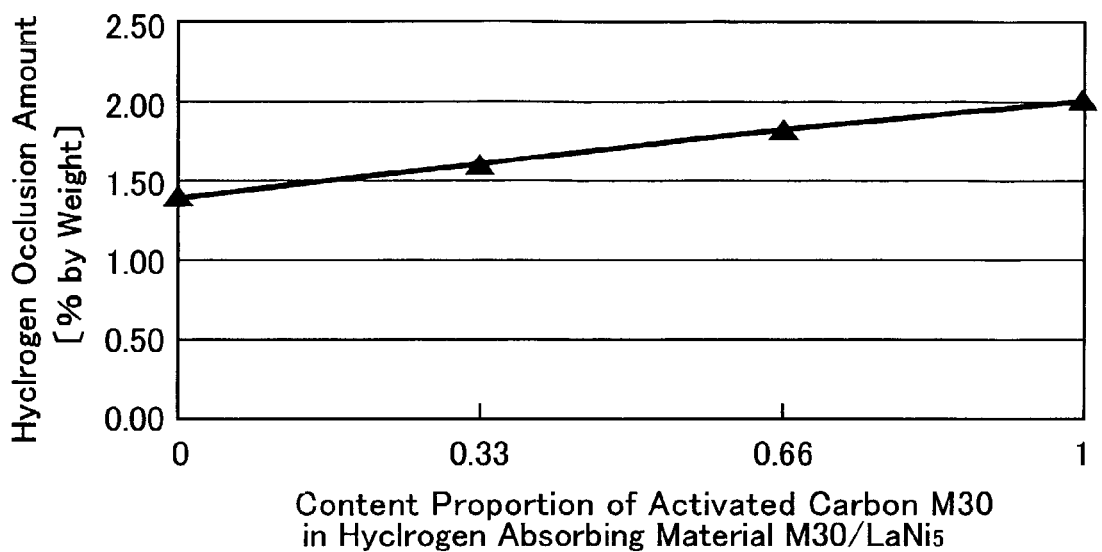
FIG. 3 illustrates, regarding hydrogen absorbing material M30/LaNi$_5$, the relationship between the content proportions of activated carbon M30 and the hydrogen storage capacities.

Moreover, with respect to hydrogen absorbing material M30/LaNi$_5$, the relationship between the content proportions of activated carbon M30 and the hydrogen storage capacities are illustrated in FIG. 3. From FIG. 3, it is understood that the hydrogen storage capacity is increased by mixing activated carbon M30, compared to the case where LaNi$_5$, being the hydrogen absorbing alloy, was used independently (the proportion of M30 is 0). Then, it is understood that, accompanied by the increment of the content proportion of activated carbon M30, the hydrogen storage capacity is increased as well. From the above, it was possible to confirm that, since the calorific value in absorbing hydrogen is less and moreover the bulk density is high, the hydrogen absorbing material, including the porous carbon material and the hydrogen absorbing alloy, can constitute a hydrogen storage apparatus whose hydrogen storage capacity per unit volume is large.

(2) Hydrogen Absorbing Material of Second Series (a) Production of Hydrogen Absorbing Material As the porous carbon material, activated carbon M30 same as the First Series was used, as the hydrogen absorbing alloy, TiFe was used, and further, as the binder, PTFE was used, and they were mixed and were thereafter treated by compression with a predetermined pressure to produce 7 types of hydrogen absorbing materials. First, 0.5 g of activated carbon M30, from 0.025 to 5 g of respective TiFe, and 0.01 g of PTFE were mixed. Subsequently, the mixtures were subjected to a high-pressure compression treatment by a compression forming machine to obtain hydrogen absorbing materials, formed as a cylinder shape having a diameter of about 16 mm. The high-pressure compression treatment was such that it was carried out at room temperature, the treatment pressure was arranged to be 734 MPa, and it was carried out from 1 to 3 times. Note that the treatments of 2 times or later were carried out, after completing the prior treatment, by pulverizing the formed raw material once. The bulk densities of the obtained hydrogen absorbing materials were measured by the above-described method. Note that the hydrogen absorbing materials, containing the binder, are such that the content proportion of the binder is as small as about 2% by weight maximally. Accordingly, it is believed that the binder influences the bulk density and the like less. Therefore, in the present preferred embodiment, the bulk densities of the hydrogen absorbing materials are measured in such a state that they include the binder, and the values are employed as the bulk densities of the hydrogen absorbing materials. The obtained hydrogen absorbing materials were subjected to an activation treatment. Note that the activation treatment was carried out by repeating the following treatments 3 times. First, with respect to the respective hydrogen absorbing materials, vacuum degassing was carried out at 450° C., and thereafter pressurizing was carried out with 1.3 MPa hydrogen at the identical temperature. After 30 minutes passed, vacuum degassing was carried out again, and the temperature was returned back to room temperature. Then, at room temperature, pressurizing was carried out with 9 MPa hydrogen, and they were held in that state for 1 hour or more.

(b) Measurement of Hydrogen Storage Capacity

With respect to the produced respective hydrogen absorbing materials, the hydrogen storage capacities were measured at a temperature of from 25 to 26° C. under a pressure of from 8.6 to 9.3 MPa, respectively. The hydrogen storage capacities were found, based on the pressure-composition isotherms (PCT lines), by means of the capacity method (JIS H 7201-1991). Moreover, each of the respective hydrogen absorbing materials was filled in a sample tube, and the temperature increment of the sample tube surface accompanied by hydrogen absorb was also measured by pressurizing with 5 MPa hydrogen. In Table 7, there are set forth the content proportions of TiFe in the respective hydrogen absorbing materials, the high-pressure compression treatment conditions, and the measurement results of the bulk densities, hydrogen storage capacities and temperature increments. Moreover, there are also set forth altogether data on M30/TiFe, being the hydrogen absorbing material of the First Series but not being subjected to the high-pressure compression treatment, activated carbon M30 and TiFe. Note that the hydrogen storage capacities (kg/100 L) in Table 7 set forth the weights of hydrogen absorbed per 100 L of each of the respective hydrogen absorbing materials.

TABLE 7

| | TiFe (% by Weight) | Conditions of High-Pressure Compression Treatment | | Hydrogen | | |
| --- | --- | --- | --- | --- | --- | --- |
| | | Treatment Pressure (MPa) | Number of Treatments (time) | Bulk Density (g/cm³) | Storage Capacity (kg/100 L) | Temp. Increment (° C.) |
| Hydrogen Absorbing Material M30/TiFe (with High-Pressure Compression Treatment) | 5 | 734 | 2 | 0.44 | 0.37 | 2 |
| | 10 | 734 | 3 | 0.46 | 0.40 | 2 |
| | 20 | 734 | 1 | 0.51 | 0.42 | 3 |
| | 50 | 734 | 1 | 0.71 | 0.81 | 13 |
| | 70 | 734 | 1 | 1.11 | 1.32 | 12 |
| | 80 | 734 | 2 | 1.50 | 2.00 | 15 |
| | 90 | 734 | 3 | 2.10 | 2.90 | 25 |
| Hydrogen Absorbing Material M30/TiFe (w/o High-Pressure Compression Treatment) | 50 | — | — | 0.38 | 0.41 | 6 |
| Activated Carbon M30 | 0 | — | — | 0.20 | 0.17 | 2 |
| TiFe | 100 | — | — | 3.00 | 4.26 | 35 |

From Table 7, the hydrogen absorbing materials, being subjected to the high-pressure compression treatment, were such that the bulk densities were heightened remarkably, compared to the case where activated carbon M30 was used independently. Moreover, even compared to the hydrogen absorbing material, not being subjected to the high-pressure compression treatment, all of the hydrogen absorbing materials, being subjected to the high-pressure compression treatment, were such that the bulk densities are higher. Then, as the proportion of TiFe, being the hydrogen absorbing alloy, is increased, the bulk density is heightened. Similarly, the hydrogen storage capacity is also enlarged as the proportion of TiFe is increased. For example, the hydrogen storage capacity of the one whose content proportion of TiFe is 50% by weight is doubled substantially, compared to that of the hydrogen absorbing material whose composition is the same but which is not subjected to the high-pressure compression treatment. Note that the temperature increment, accompanied by hydrogen absorb, is enlarged slightly as the proportion of TiFe is increased, however, when the proportion of TiFe is 80% by weight or less, the temperature increment is 15° C. or less, and accordingly it is understood to be fully appropriate for practical use. From the above, it was possible to confirm that the bulk density and hydrogen storage capacity of the obtained hydrogen absorbing material can be enlarged by treating the porous carbon material, the hydrogen absorbing alloy and the binder by compression with a high pressure.

Figure 4:
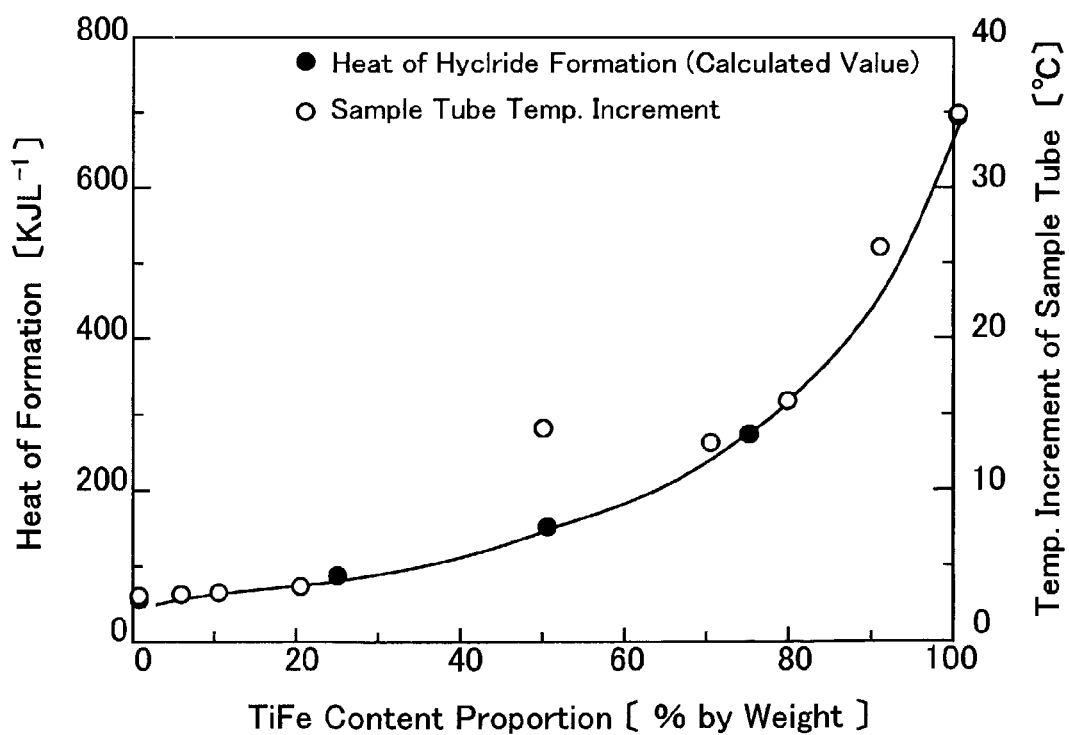
FIG. 4 illustrates, regarding hydrogen absorbing material M30/TiFe to which a high-pressure compression treatment was carried out, the relationships among the content proportions of TiFe, the temperature increments accompanied by hydrogen absorb, and the heats (calculated values) of hydride formation.

In FIG. 4, there are illustrated, regarding 7 types of hydrogen absorbing materials M30/TiFe being subjected to the high-pressure compression treatment, the relationships between the content proportion of TiFe, the temperature increment accompanied by hydrogen absorb, and the heat of hydride formation (calculated values). It is understood that the temperature increment is enlarged when the proportion of TiFe is increased. Moreover, it is understood that those with large heat of hydride formation are such that the temperature increment accompanied by hydrogen absorb is also large. Thus, it was possible to confirm that the temperature increment can be suppressed down to 15° C. or less by arranging the content proportion of the hydrogen absorbing alloy to be 80% by weight or less.

Figure 5:
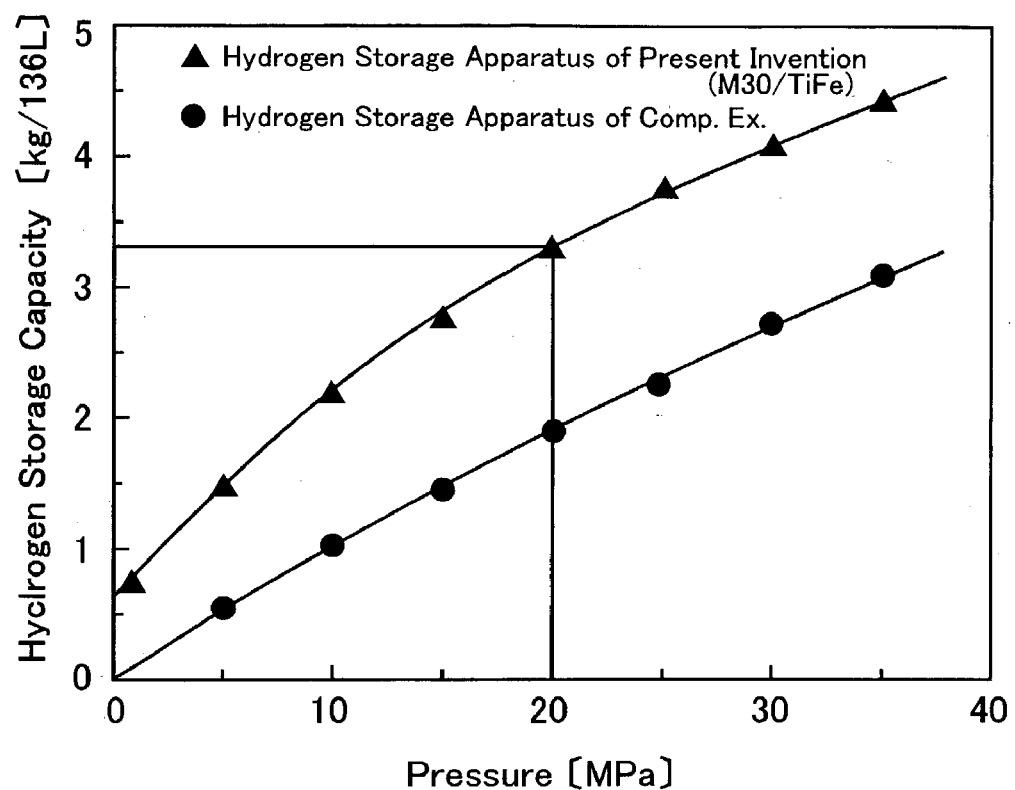
FIG. 5 illustrates the hydrogen storage capacities under respective pressures in two types of hydrogen storage apparatuses.

Moreover, among the aforementioned hydrogen absorbing materials being subjected to the high-pressure compression treatment, M30/TiFe (bulk density 0.71 g/cm³), whose content proportion of TiFe was 50% by weight, was accommodated in a high pressure bomb whose inner capacity was 136 L to manufacture a hydrogen storage apparatus. Note that the present hydrogen storage apparatus makes the hydrogen storage apparatus according to the present invention. Then, this hydrogen storage apparatus was filled with hydrogen and was pressurized to predetermined pressures, and the hydrogen storage capacities under the respective pressures were found. On the other hand, a hydrogen storage apparatus was manufactured by using an empty high pressure bomb (inner capacity 136 L) in which nothing was accommodated, and was made into a hydrogen storage apparatus of a comparative example. This hydrogen storage apparatus of the comparative example was filled with hydrogen, and the hydrogen storage capacities under the respective pressures were found in the same manner as aforementioned. In FIG. 5, there are illustrated the hydrogen storage capacities of the two types of the aforementioned hydrogen storage apparatuses under the respective pressures. From FIG. 5, both of the hydrogen storage apparatuses are such that the larger the pressure is the larger the hydrogen storage capacity is. However, the hydrogen storage apparatus according to the present invention, comprising the bomb in which the hydrogen absorbing material is accommodated, is such that the hydrogen storage capacities are enlarged at all of the pressures, compared to the hydrogen storage apparatus of the comparative example comprising the empty bomb. For example, under a pressure of 20 MPa, the hydrogen storage capacity of the hydrogen storage apparatus according to the present invention is about 1.8 times as large as the hydrogen storage capacity of the hydrogen storage apparatus of the comparative example. Therefore, it was possible to confirm that the hydrogen storage apparatus according to the present invention makes a hydrogen storage apparatus whose hydrogen storage capacity per unit volume is large.

(3) Hydrogen Absorbing Material of Third Series

(a) Production of Hydrogen Absorbing Material

(a-1) Hydrogen Absorbing Material MSC30/$Ti_{1.2}Cr_{1.9}Mn_{0.1}$

As the porous carbon material, activated carbon MSC30 (brand name, made by Kansai Netsu Kagaku Co., Ltd.), whose specific surface area was 3,220 m$^2$/g, was used, and, as the hydrogen absorbing alloy, $Ti_{1.2}Cr_{1.9}Mn_{0.1}$ (average particle diameter about 1 mm) being the titanium-chromium-based alloy was used to produce a hydrogen absorbing material. First, adsorbed moisture and the like were removed by heat-treating activated carbon MSC30. The heat treatment was carried out by holding activated carbon MSC30 in an argon atmosphere (argon gas flow rate 50 ml/min.) at 300° C. for from 2 to 4 hours. Similarly, the hydrogen absorbing alloy was subjected to an activation treatment. The activation treatment was such that a treatment was carried out by 1 time in which $Ti_{1.2}Cr_{1.9}Mn_{0.1}$ was heated to 300° C. in an argon atmosphere (argon gas flow rate 50 ml/min.), was held thereat for 2 hours, and was returned back to ordinary temperature. Then, heat-treated activated carbon MSC30 and activated $Ti_{1.2}Cr_{1.9}Mn_{0.1}$ were mixed so as to make 8:2, 5:5, 3:7, 2:8, 1:9 and 0.5:9.5 by weight ratio, respectively, to obtain 6 types of hydrogen absorbing materials, comprising MSC30 and $Ti_{1.2}Cr_{1.9}Mn_{0.1}$, (expressed as "hydrogen absorbing materials MSC30/$Ti_{1.2}Cr_{1.9}Mn_{0.1}$"). The mixing was carried out by using a mortar in an argon atmosphere for about 5 minutes. Similarly, with respect to the obtained hydrogen absorbing materials, each of them was subjected to the activation treatment under the same conditions as the activation treatment which were carried out to the containing hydrogen absorbing alloy.

(a-2) Hydrogen Absorbing Material MSC30/TiCrMn

As the porous carbon material, aforementioned activated carbon MSC30 was used, and, as the hydrogen absorbing alloy, TiCrMn (average particle diameter about 1 mm) being the titanium-chromium-based alloy was used to produce a hydrogen absorbing material in the same manner as aforementioned (a-1). First, activated carbon MSC30 was heat-treated, and TiCrMn was activated. Then, heat-treated activated carbon MSC30 and activated TiCrMn were mixed so as to make 3:7, 2:8 and 1:9 by weight ratio, respectively, to obtain 3 types of hydrogen absorbing materials MSC30/TiCrMn.

(a-3) Hydrogen Absorbing Material MSC30/$Ti_{1.2}CrMn$

As the porous carbon material, aforementioned activated carbon MSC30 was used, and, as the hydrogen absorbing alloy, $Ti_{1.2}CrMn$ (average particle diameter about 1 mm) being the titanium-chromium-based alloy was used to produce a hydrogen absorbing material in the same manner as aforementioned (a-1). First, activated carbon MSC30 was heat-treated, and $Ti_{1.2}CrMn$ was activated. Then, heat-treated activated carbon MSC30 and activated TiCrMn were mixed so as to make 3:7, 2:8 and 1:9 by weight ratio, respectively, to obtain 3 types of hydrogen absorbing materials MSC30/$Ti_{1.2}CrMn$.

(b) Measurement of Hydrogen Absorb-Desorb Capacity

With respect to the produced aforementioned respective hydrogen absorbing materials, the bulk densities and the hydrogen absorb-desorb capacities were measured, respectively. Here, the hydrogen absorb-desorb capacities are quantities of hydrogen which the hydrogen absorbing materials absorb once and desorb thereafter. The hydrogen absorb-desorb capacities were measured by arranging the pressure to be from 0.1 to 9 MPa at two types of temperatures, i.e., from 20 to 25° C. and −20° C. Moreover, with respect to activated carbon MSC30 and each of the simple substances, $Ti_{1.2}Cr_{1.9}Mn_{0.1}$, TiCrMn and $Ti_{1.2}CrMn$ being hydrogen absorbing alloys, as well, the bulk densities and the hydrogen absorb-desorb capacities were measured similarly. Note that, in the present preferred embodiment, as the bulk density, a value is employed which is calculated by filling the hydrogen absorbing materials and the like in a cylindrical container whose inner capacity is 4 ml and by dividing the weights of the filled absorbing materials with the aforementioned inner capacity.

Moreover, as reference examples, with respect to MCMB/$Ti_{1.2}Cr_{1.9}Mn_{0.1}$ in which graphitized mesocarbon microbead (graphitized MCMB), being a carbon material other than the porous carbon material and exhibiting a specific surface area being 10 m$^2$/g, and $Ti_{1.2}Cr_{1.9}Mn_{0.1}$ were mixed with 3:7 by weight ratio, and MSC30/$LaNi_5$ (only for the measurement at −20° C.) in which MSC30 and $LaNi_5$ were mixed with 3:7 by weight ratio, as well, the hydrogen absorb-desorb capacities and the like were measured similarly. The hydrogen absorb-desorb capacities were found, based on the pressure-composition isotherms (PCT lines), by means of the capacity method (JIS H 7201-1991). Moreover, in the measurements at a temperature of from 20 to 25° C., each of the aforementioned samples was filled in a sample tube whose capacity was 4 ml, and the temperature increment of the sample tube surface accompanied by hydrogen absorb was also measured by pressurizing with 5.5 MPa hydrogen. In Table 8, there are set forth the measurement results of the hydrogen absorb-desorb capacities at a temperature of from 20 to 25° C., and so forth. Moreover, in Table 9, there are set forth the measurement results of the hydrogen absorb-desorb capacities at −20° C., and so on.

TABLE 8

| Hydrogen Occluder | | Content Proportion of Hydrogen Absorbing Alloy (% by Weight) | Bulk Density (g/cm³) | Hydrogen Absorb-Desorb Capacity (% by Weight) | Temp. Increment (° C.) |
|---|---|---|---|---|---|
| Porous Carbon Material | Hydrogen Absorbing Alloy | | | | |
| Activated Carbon MSC30 | $Ti_{1.2}Cr_{1.9}Mn_{0.1}$ | 20 | 0.4 | 1.0 | 3 |
| | | 50 | 0.6 | 1.0 | 3 |
| | | 70 | 1.0 | 1.0 | 4 |
| | | 80 | 1.3 | 1.1 | 6 |
| | | 90 | 2.0 | 1.1 | 14 |
| | | 95 | 2.8 | 1.1 | 23 |
| Activated Carbon MSC30 | TiCrMn | 70 | 1.0 | 0.9 | 4 |
| | | 80 | 1.3 | 1.0 | 6 |
| | | 90 | 2.0 | 1.0 | 13 |
| Activated Carbon MSC30 | $Ti_{1.2}CrMn$ | 70 | 1.0 | 1.4 | 5 |
| | | 80 | 1.3 | 1.4 | 7 |
| | | 90 | 2.0 | 1.5 | 14 |
| Activated Carbon MSC30 | — | — | 0.3 | 1.0 | 2 |
| — | $Ti_{1.2}Cr_{1.9}Mn_{0.1}$ | — | 3.0 | 1.1 | 25 |
| — | TiCrMn | — | 3.0 | 0.9 | 26 |
| — | $Ti_{1.2}CrMn$ | — | 3.0 | 1.5 | 28 |
| MCMB | $Ti_{1.2}Cr_{1.9}Mn_{0.1}$ | 70 | 1.8 | 0.7 | 7 |

TABLE 9

| Hydrogen Occluder | | Content Proportion of Hydrogen Absorbing Alloy (% by Weight) | Bulk Density (g/cm³) | Hydrogen Absorb-Desorb Capacity (% by Weight) |
|---|---|---|---|---|
| Porous Carbon Material | Hydrogen Absorbing Alloy | | | |
| Activated Carbon MSC30 | $Ti_{1.2}Cr_{1.9}Mn_{0.1}$ | 70 | 1.0 | 1.1 |
| | | 80 | 1.3 | 1.1 |
| | | 90 | 2.0 | 1.1 |
| Activated Carbon MSC30 | TiCrMn | 70 | 1.0 | 1.4 |
| | | 80 | 1.3 | 1.5 |
| | | 90 | 2.0 | 1.5 |
| Activated Carbon MSC30 | $Ti_{1.2}CrMn$ | 70 | 1.0 | 1.4 |
| | | 80 | 1.3 | 1.5 |
| | | 90 | 2.0 | 1.5 |
| Activated Carbon MSC30 | — | — | 0.3 | 1.2 |
| — | $Ti_{1.2}Cr_{1.9}Mn_{0.1}$ | — | 3.0 | 1.1 |
| — | TiCrMn | — | 3.0 | 1.5 |
| — | $Ti_{1.2}CrMn$ | — | 3.0 | 1.5 |
| MCMB | $Ti_{1.2}Cr_{1.9}Mn_{0.1}$ | 70 | 1.8 | 0.7 |
| Activated Carbon MSC30 | $LaNi_5$ | 70 | 1.1 | 0.4 |

First, descriptions will be made on Table 8. From Table 8, regardless of the types of the hydrogen absorbing alloys, it is understood that all of the hydrogen absorbing materials are such that the bulk densities are heightened, compared to the case where activated carbon MSC30 was used independently. Then, the larger the content proportion of the hydrogen absorbing alloys in the respective hydrogen absorbing materials is the higher the bulk density is. On the other hand, the temperature increment, accompanied by the hydrogen absorb of the hydrogen absorbing materials, was decreased compared to the cases where the respective hydrogen absorbing alloys were used independently. Note that the temperature increment is enlarged as the content proportion of the hydrogen absorbing alloys in the respective hydrogen absorbing materials is increased. However, when the content proportion of the hydrogen absorbing alloys was 90% by weight or less, the temperature increment was kept at about ½ of those in which the respective hydrogen absorbing alloys were used independently. Moreover, all of the hydrogen absorbing materials absorbed-desorbed approximately the same extents of hydrogen as the cases where the respective hydrogen absorbing alloys were used independently. Note that the one in which MCMB, not being the porous carbon material, was mixed with $Ti_{1.2}Cr_{1.9}Mn_{0.1}$ was such that the hydrogen absorb-desorb amount was decreased and the temperature increment, accompanied by hydrogen absorb, was enlarged, compared to the hydrogen absorbing material in which $Ti_{1.2}Cr_{1.9}Mn_{0.1}$ was mixed with the same proportion.

Thus, since the hydrogen absorbing material including the porous carbon material and the hydrogen absorbing alloy is such that the calorific value in absorbing hydrogen is small and moreover the bulk density is high, it is possible to confirm that it can constitute a hydrogen storage apparatus whose hydrogen storage capacity per unit volume is large. In particular, when the titanium-chromium-based alloy is used as the hydrogen absorbing alloy, the hydrogen absorbing material whose content proportion of the hydrogen absorbing alloy in the hydrogen absorbing material is from 50% by weight or more to 90% by weight showed the results which can satisfy all of the calorific value accompanied by hydrogen absorb, the bulk density and the hydrogen absorb-desorb amount.

Next, descriptions will be made on Table 9. From Table 9, even at such a low temperature as −20° C., all of the hydrogen absorbing materials, using the titanium-chromium-based alloys as the hydrogen absorbing alloy, absorbed-desorbed hydrogen to the same extent as the cases where the respective hydrogen absorbing alloys were used independently. Moreover, those hydrogen absorb-desorb capacities were substantially identical values with the results, set forth in aforementioned Table 3, which were measured at from 20 to 25° C., and were increased in the hydrogen absorbing material using TiCrMn. Namely, the hydrogen absorbing materials using the titanium-chromium-based alloys are such that the fluctuations of the hydrogen absorb-desorb capacities by the temperature change are less. On the other hand, the hydrogen absorbing material using $LaNi_5$ as the hydrogen absorbing alloy is such that the hydrogen absorb-desorb capacity became smaller, compared to the other hydrogen absorbing materials in which the titanium-chromium-based alloys were mixed with the same proportion. This is believed to result from the fact that, at such a low temperature condition as −20° C., though $LaNi_5$ absorbed hydrogen, it could not desorb it fully. Moreover, the one in which the MCMB, not being the porous carbon material, was mixed with $Ti_{1.2}Cr_{1.9}Mn_{0.1}$ is such that the hydrogen absorb-desorb capacity became smaller, compared to the hydrogen absorbing material in which $Ti_{1.2}Cr_{1.9}Mn_{0.1}$ was mixed with the same proportion. Note that, similarly to the results set forth in aforementioned Table 8, all of the hydrogen absorbing materials are such that the bulk densities became higher, compared to the case where activated carbon MSC30 was used independently. Then, the larger the content proportion of the hydrogen absorbing alloys in the respective hydrogen absorbing materials is, the higher the bulk density is. Thus, it was understood that the hydrogen absorbing materials using the titanium-chromium-based alloys as the hydrogen absorbing alloy are such that, at such a low temperature as −20° C., the hydrogen absorb-desorb capacities are large. Therefore, it was possible to confirm that, since the hydrogen absorbing material including the porous carbon material and the titanium-chromium-based alloy is such that the hydrogen absorb-desorb capacity is large even at such a low temperature as −20° C. and the bulk density is high, it can constitute a hydrogen storage apparatus whose hydrogen absorb-desorb capacity is large even when it is used at a low temperature.

What is claimed is:

1. A hydrogen storage apparatus comprising a hydrogen absorbing material comprising a porous carbon material with a specific surface area of 1,000 $m^2/g$ or more, and a hydrogen absorbing alloy wherein the hydrogen storage apparatus includes a container and the hydrogen absorbing material accommodated in the container.

2. The hydrogen storage apparatus set forth in claim 1, wherein a content proportion of said hydrogen absorbing alloy in said hydrogen absorbing material is from 10% by weight or more to 80% by weight or less.

3. The hydrogen storage apparatus set forth in claim 1, wherein said hydrogen absorbing material comprises a binder binding said porous carbon material and said hydrogen absorbing alloy.

4. The hydrogen storage apparatus set forth in claim 3, wherein a content proportion of said binder in said hydrogen absorbing material is 20% by weight or less.

5. The hydrogen storage apparatus set forth in claim 3, wherein said binder is a fluorocarbon resin.

6. The hydrogen storage apparatus set forth in claim 1, wherein said hydrogen absorbing material is one which is obtained by being subjected to a high-pressure compression treatment.

7. The hydrogen storage apparatus set forth in claim 6, wherein a treatment pressure of said high-pressure compression treatment is from 100 MPa to 2,000 MPa.

8. The hydrogen storage apparatus set forth in claim 1, wherein said porous carbon material is activated carbon.

9. The hydrogen storage apparatus set forth in claim 1, wherein said hydrogen storage alloy is at least one member selected from rare-earth-based alloys and titanium-based alloys.

10. The hydrogen storage apparatus set forth in claim 9, wherein said titanium-based alloy is at least one member of titanium-chromium-based alloys and titanium-manganese-based alloys.

* * * * *